United States Patent
Harra et al.

(10) Patent No.: US 11,938,677 B2
(45) Date of Patent: Mar. 26, 2024

(54) POSITIONING SYSTEM

(71) Applicants: John Martin Harra, New York City, NY (US); Alexander Walter Jedynski, Whitestone, NY (US); Keith Michael Gildea, Pasadena, CA (US)

(72) Inventors: John Martin Harra, New York City, NY (US); Alexander Walter Jedynski, Whitestone, NY (US); Keith Michael Gildea, Pasadena, CA (US)

( * ) Notice: Subject to any disclaimer, the term of this patent is extended or adjusted under 35 U.S.C. 154(b) by 927 days.

(21) Appl. No.: 16/873,600

(22) Filed: May 14, 2020

(65) Prior Publication Data
US 2021/0354383 A1    Nov. 18, 2021

(51) Int. Cl.
| | | |
|---|---|---|
| B29C 64/245 | (2017.01) | |
| B23Q 1/26 | (2006.01) | |
| B23Q 1/62 | (2006.01) | |
| B29C 64/209 | (2017.01) | |
| B29C 64/241 | (2017.01) | |
| B33Y 30/00 | (2015.01) | |

(52) U.S. Cl.
CPC ............ *B29C 64/245* (2017.08); *B23Q 1/262* (2013.01); *B23Q 1/623* (2013.01); *B29C 64/209* (2017.08); *B29C 64/241* (2017.08); *B33Y 30/00* (2014.12)

(58) Field of Classification Search
CPC ... B29C 64/245; B29C 64/241; B29C 64/209; B23Q 1/623; B23Q 1/262; B33Y 30/00
See application file for complete search history.

(56) References Cited

U.S. PATENT DOCUMENTS

| | | | | | |
|---|---|---|---|---|---|
| 3,155,383 | A * | 11/1964 | Whitmore | .......... | F16M 11/2085 384/100 |
| 4,729,536 | A * | 3/1988 | Scala | ..................... | B23Q 1/621 108/143 |
| 5,323,712 | A * | 6/1994 | Kikuiri | ................ | F16M 11/123 108/138 |
| 5,481,936 | A * | 1/1996 | Yanagisawa | ........... | B23Q 1/621 74/490.1 |
| 5,804,932 | A * | 9/1998 | Yanagisawa | ........... | B25J 9/1045 108/143 |
| 5,980,192 | A * | 11/1999 | Arai | ....................... | B23Q 5/408 414/749.6 |
| 6,196,138 | B1 * | 3/2001 | Sakai | ..................... | F16C 29/008 108/143 |
| 6,635,887 | B2 * | 10/2003 | Kwan | ................. | G03F 7/70716 355/72 |
| 7,707,907 | B2 * | 5/2010 | Bonev | ....................... | B25J 9/106 74/490.03 |
| 7,823,516 | B2 * | 11/2010 | Yamazaki | ................ | B23Q 1/60 108/20 |
| 8,104,752 | B2 * | 1/2012 | Eidelberg | ............... | G03B 27/58 108/143 |

(Continued)

FOREIGN PATENT DOCUMENTS

WO    WO 2019/076705 A1    4/2019

*Primary Examiner* — Victor L MacArthur
(74) *Attorney, Agent, or Firm* — Eugene S. Indyk

(57) ABSTRACT

A positioning system moves an object in two generally orthogonal directions using a rotationally adjustable bearing system that connects the object to two pairs of non-parallel rails, the bearing system permitting the object to be smoothly translated in one or two directions to a desired position in planar space. This translation is performed smoothly notwithstanding a lack of parallelism between the linear rails.

24 Claims, 26 Drawing Sheets

(56) References Cited

U.S. PATENT DOCUMENTS

| | | | |
|---|---|---|---|
| 8,109,395 B2* | 2/2012 | Gaunekar | B23Q 1/012 |
| | | | 212/324 |
| 2010/0021580 A1 | 1/2010 | Swanson et al. | |
| 2013/0078073 A1 | 3/2013 | Comb et al. | |
| 2016/0185039 A1 | 6/2016 | Carbone et al. | |
| 2016/0379512 A1 | 12/2016 | Kirkman | |
| 2023/0134177 A1* | 5/2023 | Reusch | B28B 1/001 |
| | | | 425/143 |
| 2023/0147930 A1* | 5/2023 | Lindemann | B33Y 10/00 |
| | | | 264/31 |

* cited by examiner

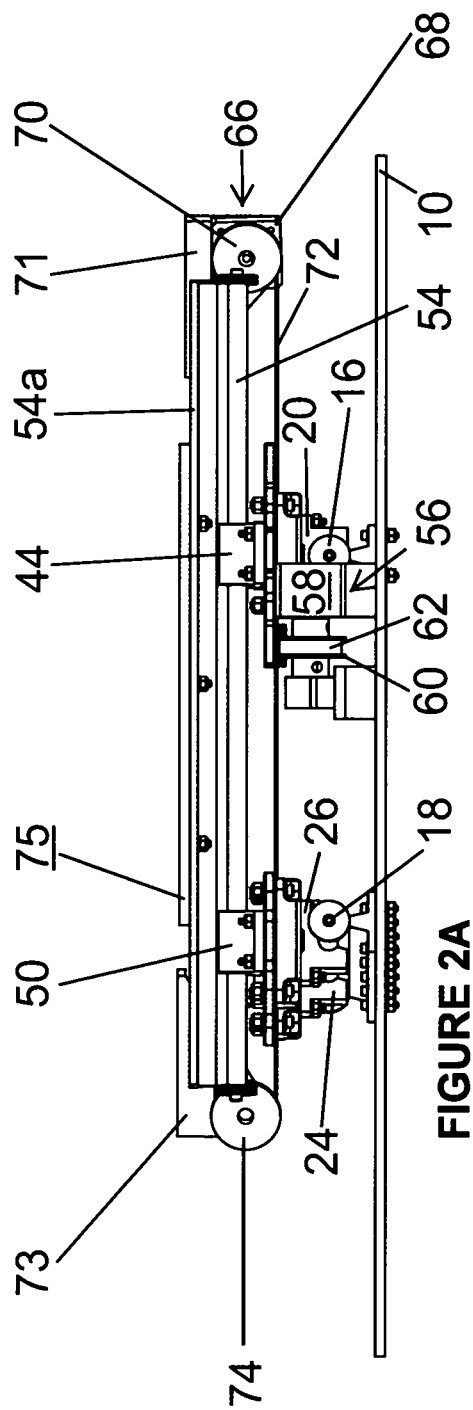
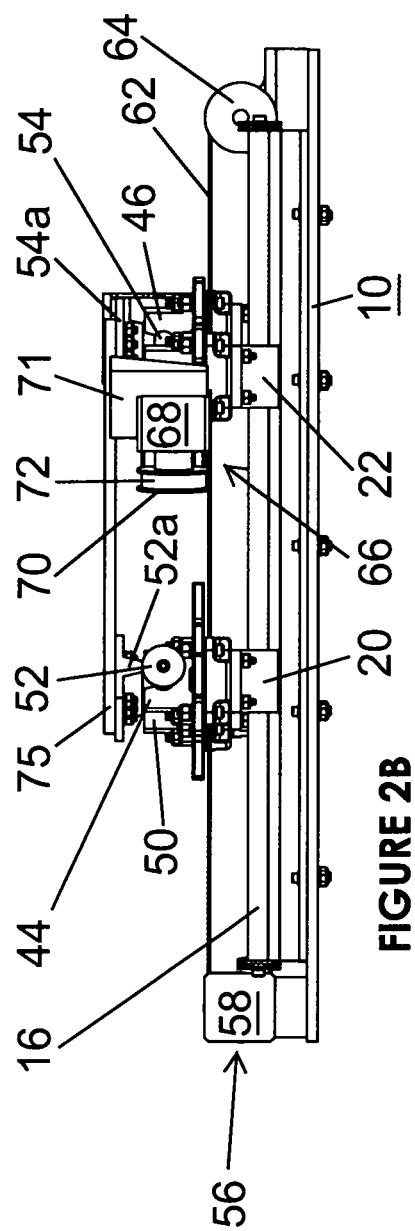
FIGURE 2A
FIGURE 2B

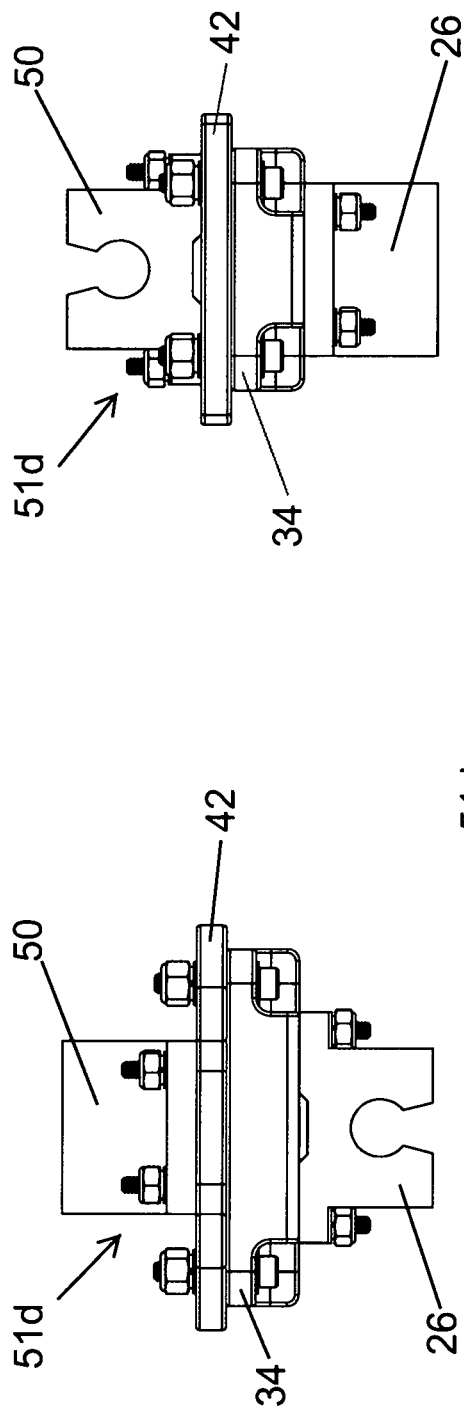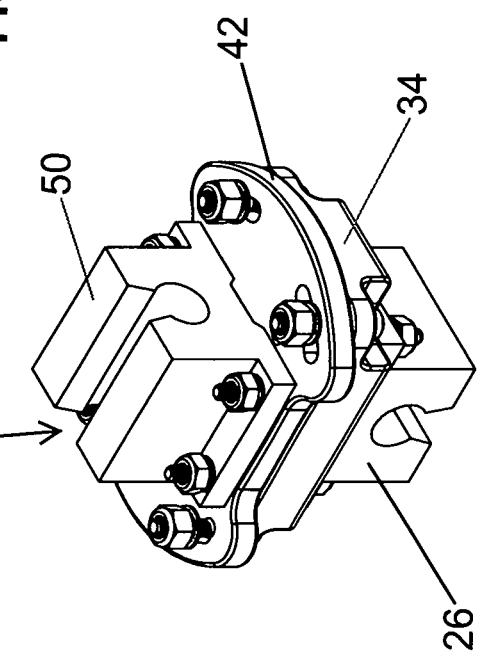
FIGURE 3C
FIGURE 3A
FIGURE 3B

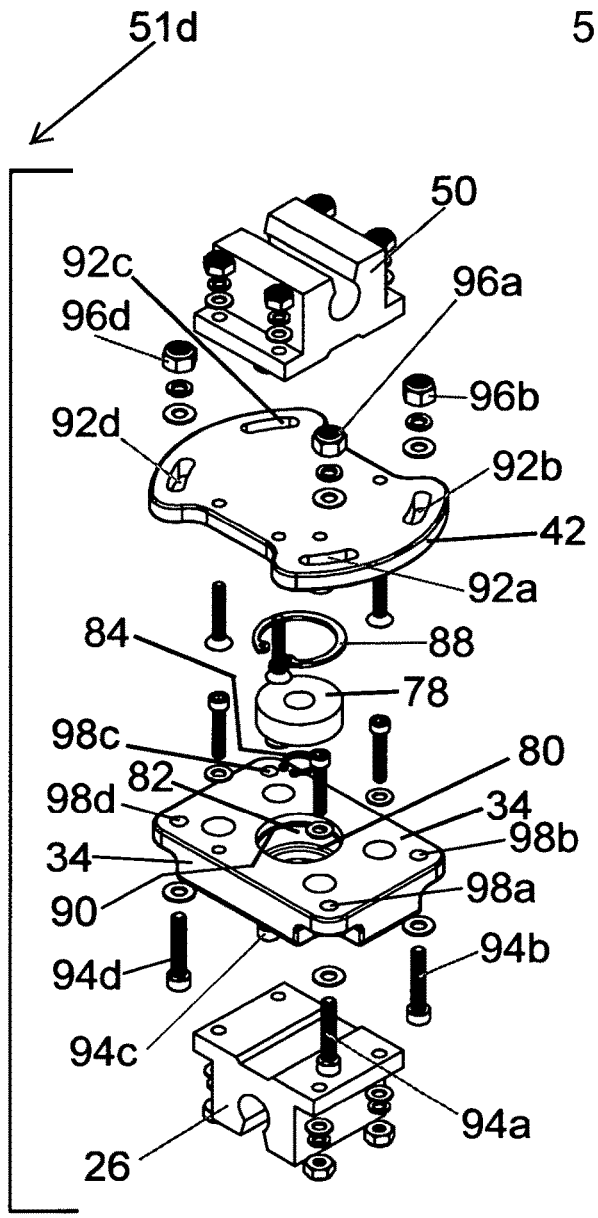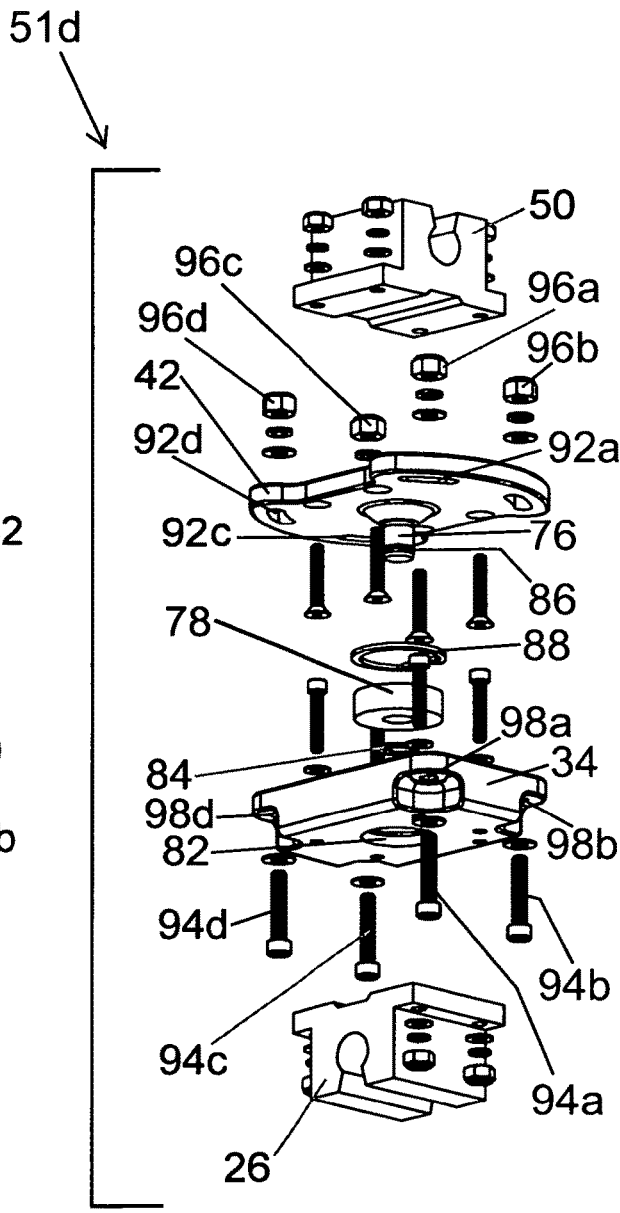
FIGURE 3D
FIGURE 3E

FIGURE 4A  FIGURE 4C

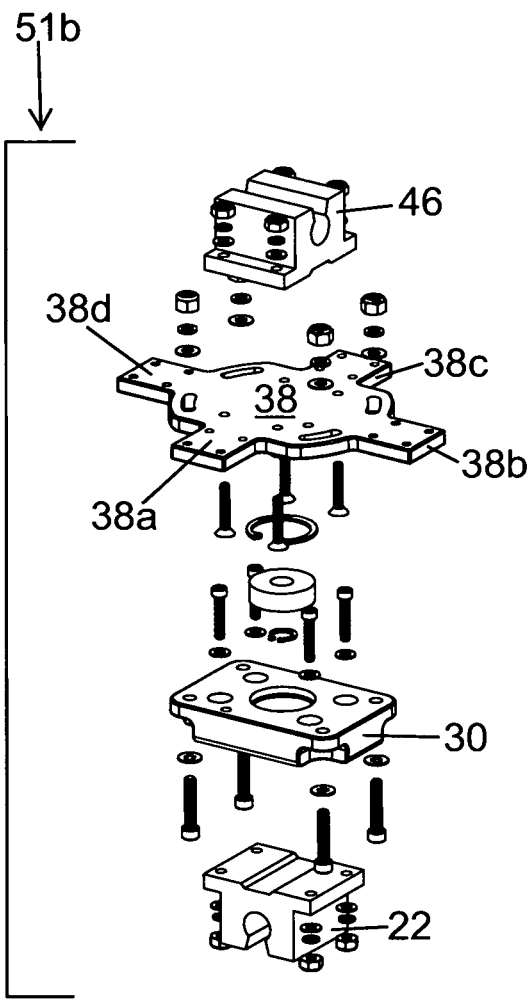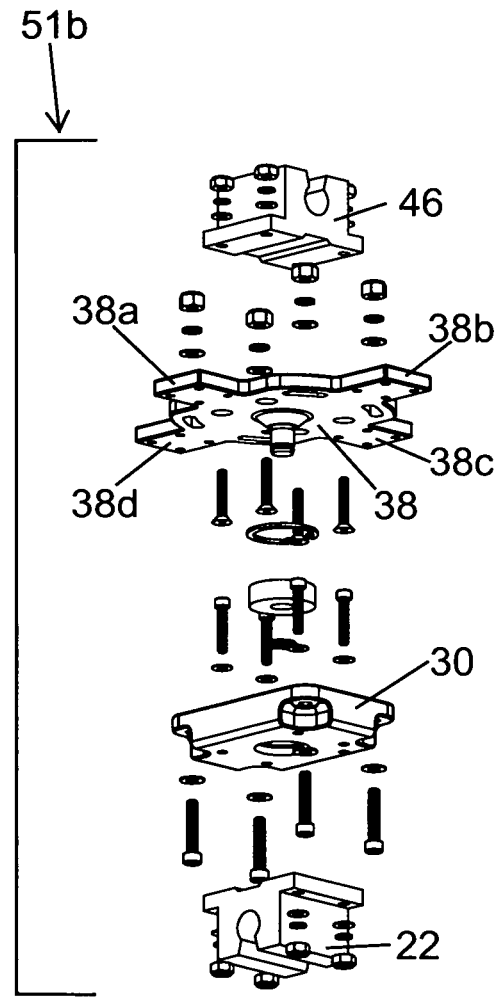
FIGURE 6D          FIGURE 6E

POSITIONING SYSTEM

TECHNICAL FIELD

This relates in general to positioning systems, and in particular, to positioning systems that move an object, such as a workpiece or tool in a manufacturing apparatus, in two generally orthogonal directions to a desired position.

BACKGROUND

Many operations in the mechanical arts require an object to be precisely positioned in two dimensional space. The object to be positioned is usually supported on a flat platform that is movable in two orthogonal directions, usually represented by the X- and Y-directions on a Cartesian coordinate plane. Such a structure is sometimes referred to as an X-Y positioning table.

Machine based manufacturing requires that a workpiece be movable in two dimensions to position it with respect to the operative part of machine so that manufacturing operations can be performed at desired location on the workpiece. Alternatively, the operative part of the machine may be movable in two dimensions with respect to a stationary workpiece. For example, additive manufacturing requires that a workpiece be moved in two dimensions with respect to a spray head, extrusion head, or any other structure that deposits material in a desired pattern on the workpiece. Also, for example, negative manufacturing requires that a workpiece be moved to a predetermined location with respect to a material removal element that shapes the workpiece.

The platform supporting the object to be positioned typically is attached to linear bearings that ride on a pair of parallel rails fixed to a stationary base. It is important that these two rails are precisely parallel. Any deviation from parallelism will decrease the smoothness with which the platform is moved, and will cause wear that will decrease the positional accuracy of the device over time. The platform may even hang up or stop as it is moved to a desired location. Non-parallelism of the rails eventually may cause severe damage to the rails and the linear bearings as well.

It is extremely difficult and expensive to position the rails so that they are precisely parallel. This is particularly the case in large structures involving long rails. Any slight misalignment at one end of the rails is magnified to a great degree at the other end of the rails. A significant departure from parallelism is nearly a given in such structures. Accordingly, there is a need in both small and large structures, to somehow compensate for any deviation from parallelism in the rail system used in a two dimensional positioning system.

SUMMARY

The problem of forming precisely parallel rails described above is solved by a novel positioning system adapted to smoothly move an object in one or two dimensional space using a bearing system that connects the object to two non-parallel rails, the bearing system permitting the object to be smoothly translated to a desired position. This translation is performed smoothly notwithstanding a lack of parallelism between the two rails.

BRIEF DESCRIPTION OF THE DRAWINGS

FIG. 1A is an isometric view of a base plate on which the components of an example of a X-Y positioning table are mounted.

FIG. 1B adds two lower non-parallel linear rails on top of the base plate of FIG. 1A.

FIG. 1C adds four lower linear bearings slidably engaged with the two lower rails of FIG. 1B.

FIG. 1D adds lower bearing mounts to each of the four linear bearings of FIG. 1C.

FIG. 1E adds upper bearing mounts to each of the four lower bearing mounts of FIG. 1D.

FIG. 1F adds four upper linear bearings to the upper bearing mounts in FIG. 1D, thereby completing four bearing assemblies that ride on the lower linear rails.

FIG. 1G adds two upper linear rails that slide in the upper linear bearings of FIG. 1F.

FIG. 1H adds an X-direction drive mechanism for the X-Y positioning table of FIG. 1G.

FIG. 1I adds a Y-direction drive mechanism for the X-Y positioning table of FIG. 1H.

FIG. 1J attaches a flat plate to the upper rails shown in FIG. 1I, that can act as a work table in some applications or a tool support structure in other applications, thus completing an X-Y positioning table in accordance with one example of the invention.

FIG. 2A is a side view of the X-Y positioning table of FIG. 1J, looking in the positive X-direction.

FIG. 2B is a front view of the X-Y positioning table of FIG. 1J, looking in the positive Y-direction.

FIG. 3A is an isometric view of one of the two tab-less bearing assemblies shown in FIG. 1F.

FIG. 3B is a front view of the bearing assembly of FIG. 3A looking in the positive X-direction.

FIG. 3C is a side view of the bearing assembly of FIG. 3A looking in the positive Y-direction.

FIG. 3D is an isometric exploded view of the bearing assembly of FIG. 3A looking from above the bearing assembly.

FIG. 3E is an isometric exploded view of the bearing assembly of FIG. 3A looking from beneath the bearing assembly.

FIG. 4A is a bottom view of the upper bearing mount shown in FIG. 3A-3E.

FIG. 4C is a magnified view of the circled portion labeled A of the upper bearing mount shown in FIG. 4B.

FIG. 6D is an isometric exploded view of the bearing assembly of FIG. 6A looking from above the bearing assembly.

FIG. 6E is an isometric exploded view of the bearing assembly of FIG. 6A looking from beneath the bearing assembly.

DETAILED DESCRIPTION

Figure 1A:
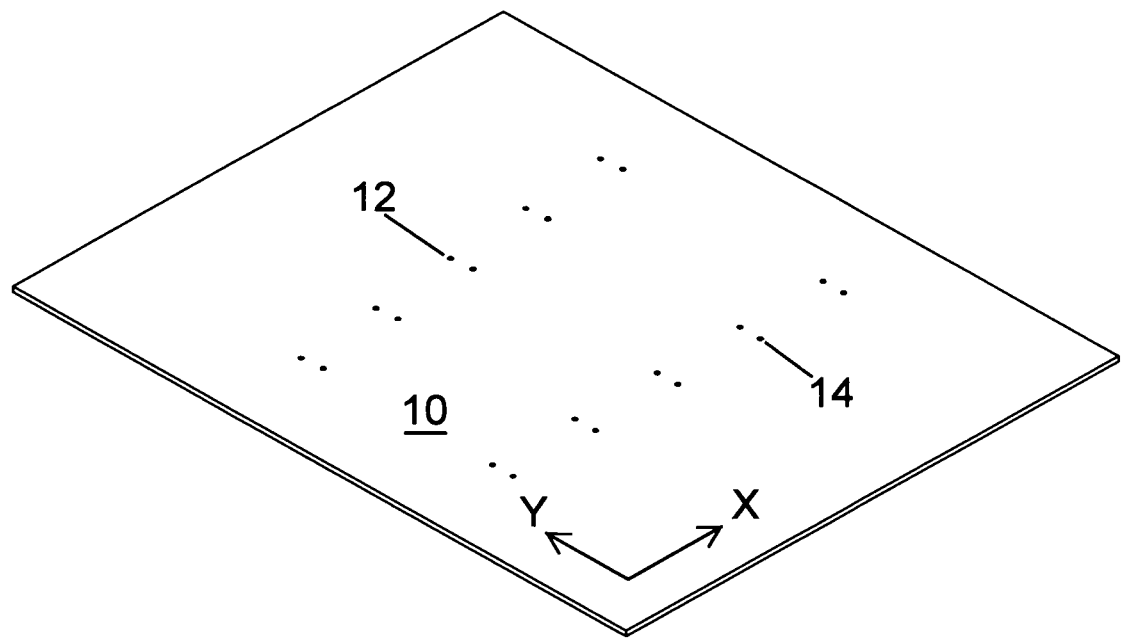
FIGS. 1A-1J are step-by-step assembly drawings showing the construction of an example of an X-Y positioning table in accordance with the invention.

FIG. 1A illustrates a flat rigid base plate 10 that supports and stabilizes the structure of an illustrative X-Y positioning table in accordance with the invention. The base plate 10 may be supported on any suitable structure that immobilizes the base plate 10 to provide a stationary frame of reference for the positioning table. Two rows of marks are formed in the surface of the base plate 10 to show where two elongated lower rails are to be illustratively screwed or bolted to the base plate 10. Reference numeral 12 indicates where one of the rails is to be attached; reference numeral 14 indicates where the other of the rails is to be attached.

Figure 1B:
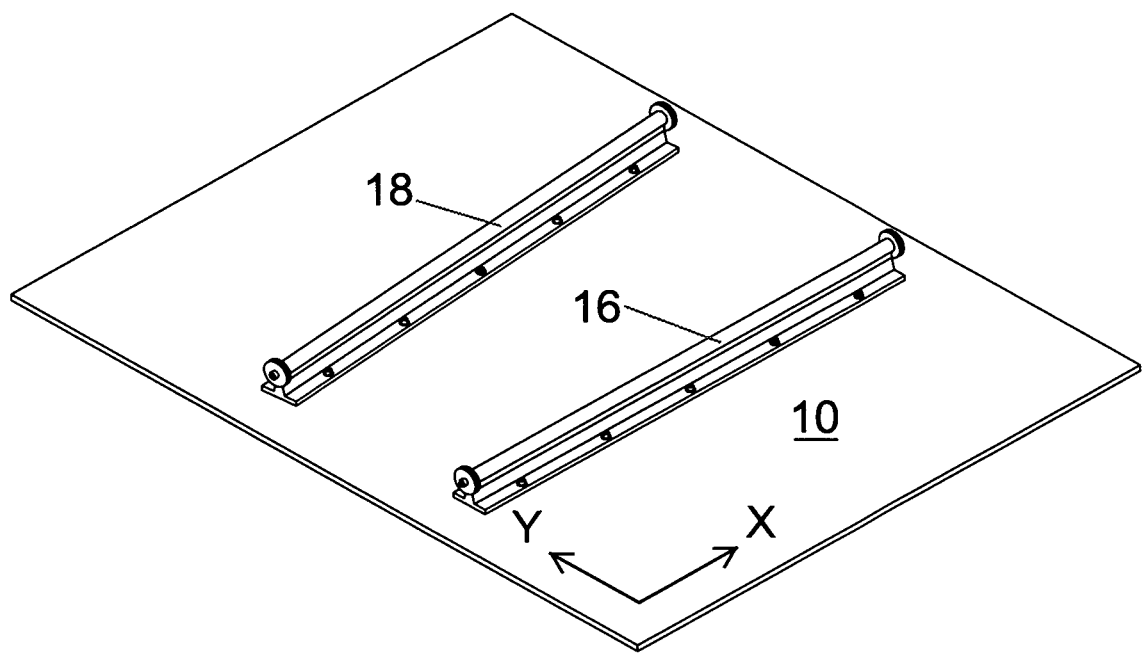

FIG. 1B shows a pair of lower linear rails 16 and 18 attached to the base plate 10. As shown in FIG. 1B, the two lower rails 16 and 18 are not parallel to one another. In the past, the rails had to be precisely parallel, namely, they had to form an angle of precisely 0° as closely as possible, particularly in large structures. This invention avoids the requirement in prior X-Y positioning tables of having precisely parallel rails, which is expensive and time consuming to achieve, in order to eliminate the operational problems identified above, namely, resistance to smooth motion, inaccuracy, wear, and damage. The invention is not limited to non-parallel lower rails at any specific angle. Illustratively, the lower two rails make an angle of about 5° with respect to one another. The angle, however, can be anywhere from slightly above 0° to about 15° or more. By way of example, the lower rails 16 and 18 may be Thomson SRA-8 linear rails.

Figure 1C:
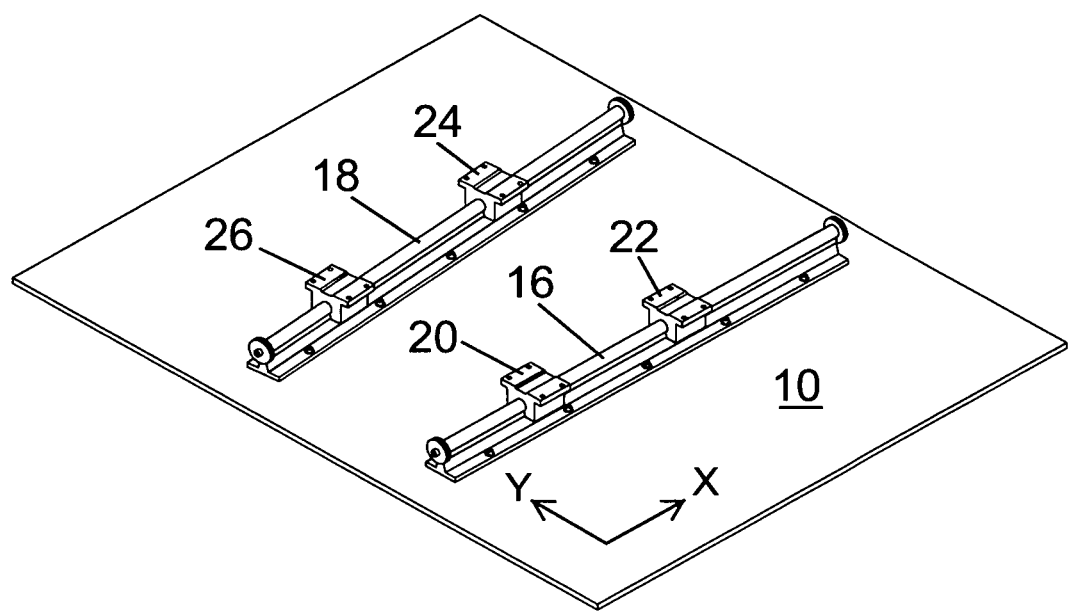

FIG. 1C shows lower linear bearings 20, 22, 24, and 26 attached to the rails 16 and 18. The bearings 20, 22, 24, and 26 are made of low coefficient of friction material. They grasp the rails 16 and 18 and are slidable longitudinally along the rails 16 and 18 facilitated by the low coefficient of friction material. Also by way of example, the lower linear bearings 20, 22, 24, and 26 may be Thomson SSUPB08 linear bearings.

Figure 1D:
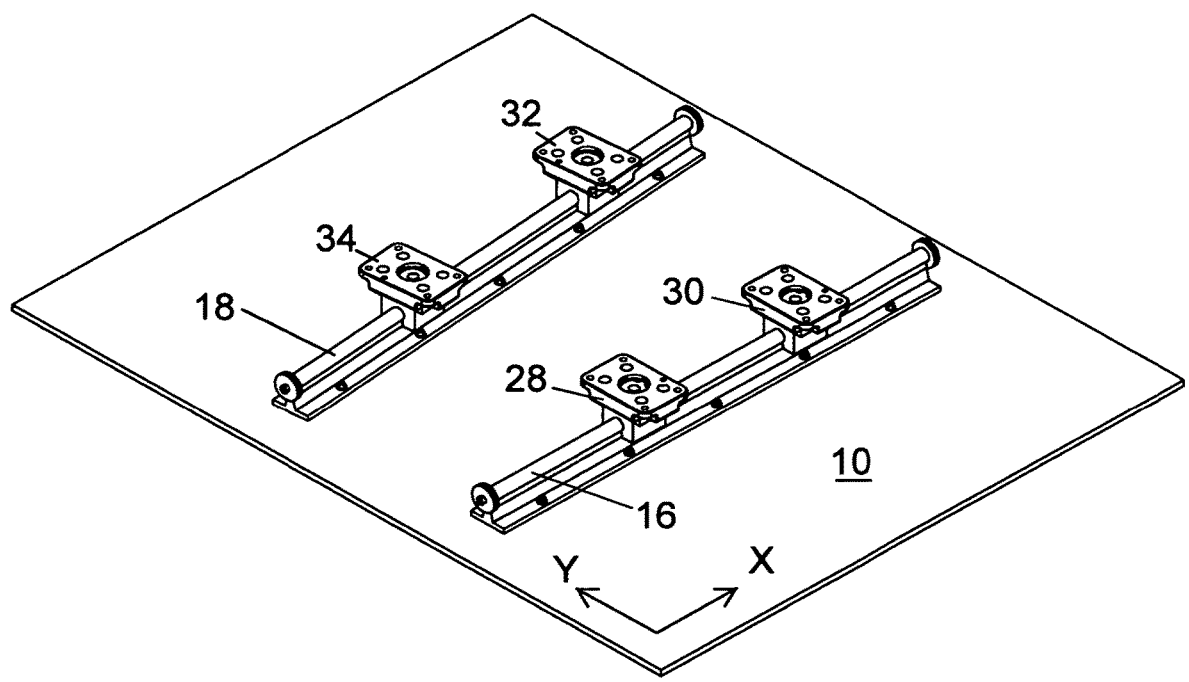
Figure 1E:
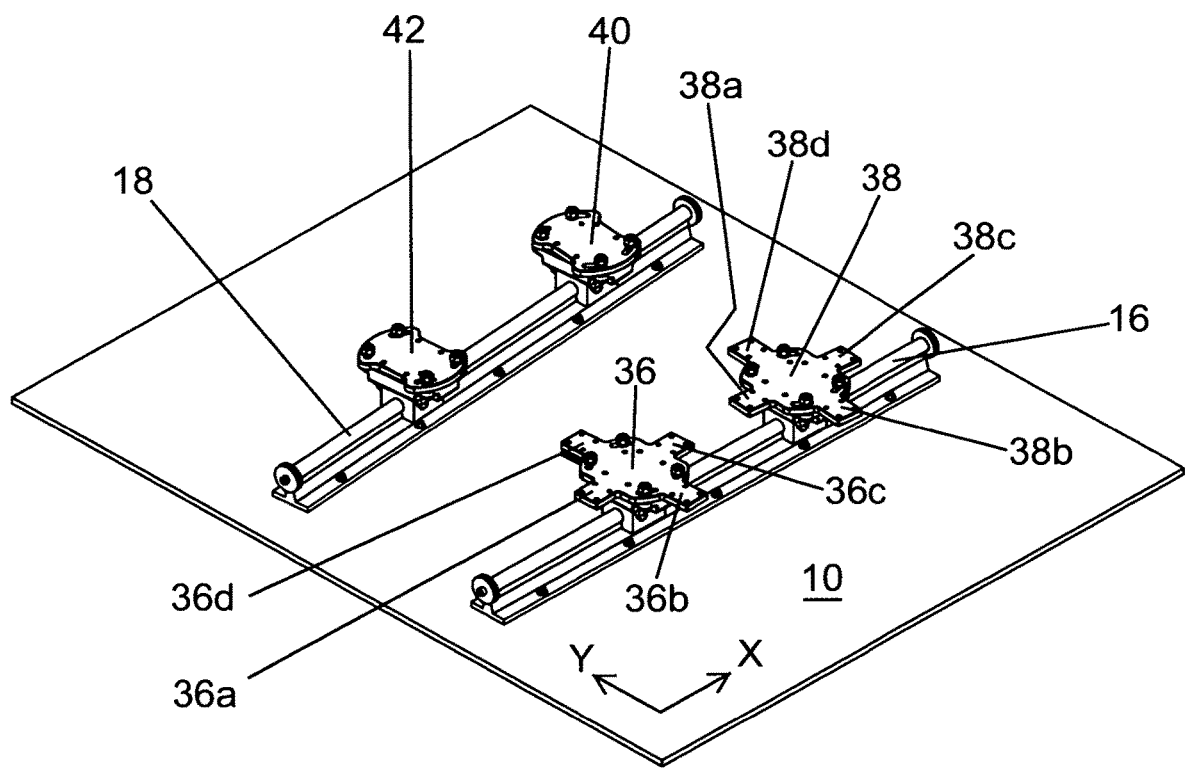
Figure 1F:
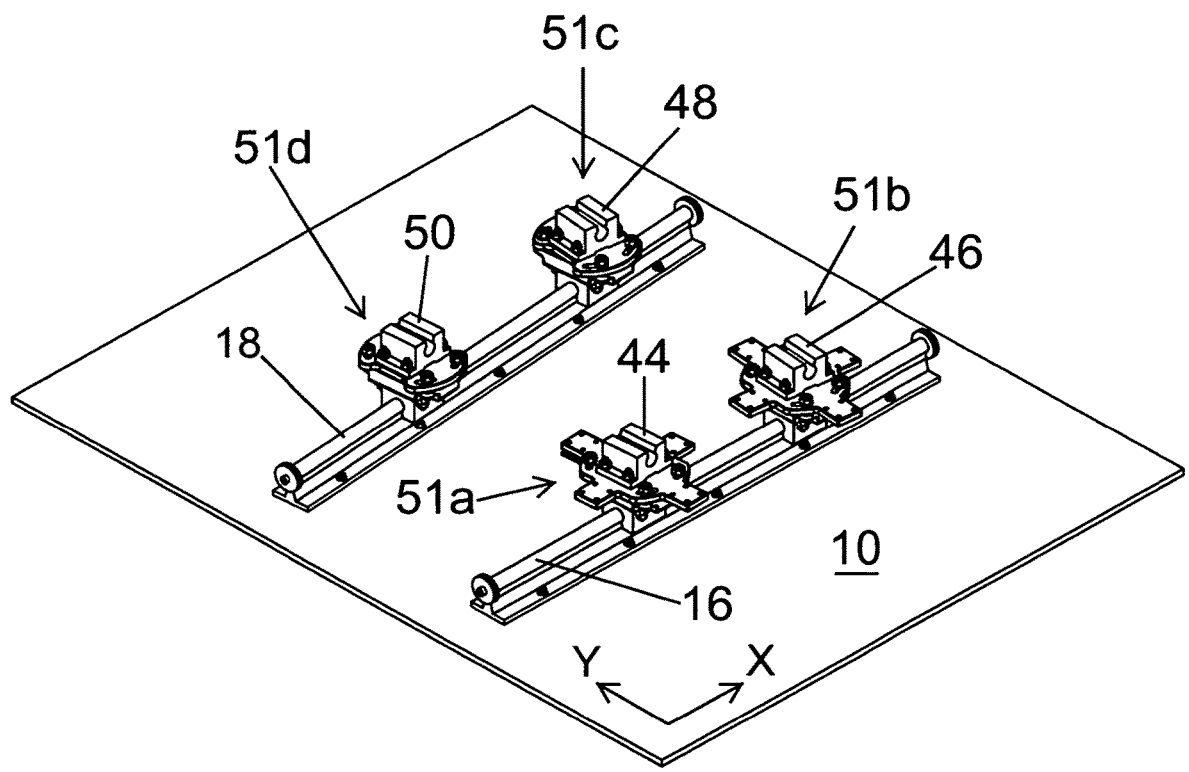

FIG. 1D shows lower bearing mounts 28, 30, 32, and 34 attached to the lower linear bearings 20, 22, 24, and 26, respectively. FIG. 1E shows upper linear bearing mounts 36, 38, 40, and 42, attached to the top of the lower bearing mounts 28, 30, 32, and 34, respectively. Upper bearing mounts 36 and 38 are identical to upper bearing mounts 40 and 42, except bearing mount 36 has four tabs 36a, 36b, 36c, and 36d extending outwardly from the bearing mount 36 as shown in FIG. 1E and, similarly, bearing mount 38 has four tabs 38a, 38b, 38c, and 38d extending outwardly from the bearing mount 38 also as shown in FIG. 1E FIG. 1F shows upper bearings 44, 46, 48, and 50, preferably identical to the lower bearings 28, 30, 32, and 34, and attached to the upper bearing mounts 36, 38, 40, and 42, respectively. This completes the depiction of two bearing assemblies 51a and 51b on rail 16 and two bearing assemblies 51c, and 51d on rail 18.

Figure 1G:
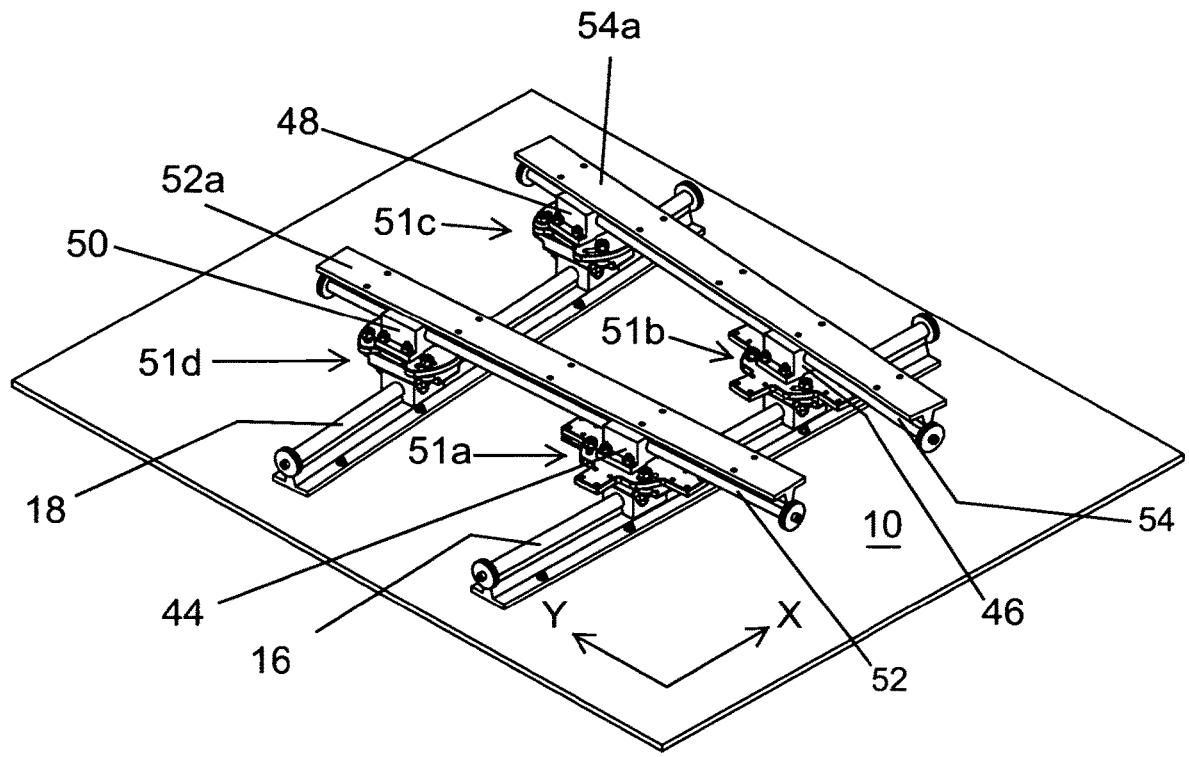

FIG. 1G shows upper linear rails 52 and 54 slidably engaged with the upper bearings 44, 46, 48, and 50 on top of the bearing assemblies 51a, 51b, 51c, and 51d, respectively. Like lower rails 16 and 18, upper rails 52 and 54 are not parallel to one another. The angle upper rails 52 and 54 make with one another is similar to the angle lower rails 16 and 18 make with one another. The upper rails 52 and 54 are preferably identical to lower rails 16 and 18. Like the lower rails 16 and 18, the angle made by the non-parallel upper rails may be any angle from slightly above 0° to about 15° or more.

Not shown in the Figures discussed so far, but evident in FIGS. 3A-3E, is that in each bearing assembly 51a, 51b, 51c, and 51d, the upper bearing mounts 36, 38, 40, and 42, and their respective upper bearings 44, 46, 48, and 50, are rotatable with respect to the lower bearing mounts 28, 30, 32, and 34, and their respective lower bearings 20, 22, 24, and 26. Rotation of the upper bearings 44, 46, 48, and 50 with respect to the lower bearings 20, 22, 24, and 26 is facilitated by the provision of a rotatable ball bearing structure shown in FIGS. 3D and 3E between the lower bearing mounts 28, 30, 32, and 34 and the upper bearing mounts 36, 38, 40, and 42. This rotatable nature of the upper bearings with respect to the lower bearings permits the orientation of the linear bearings to be adjusted to accommodate the non-parallel nature of the rails 16, 18, 52 and 54.

Figure 1H:
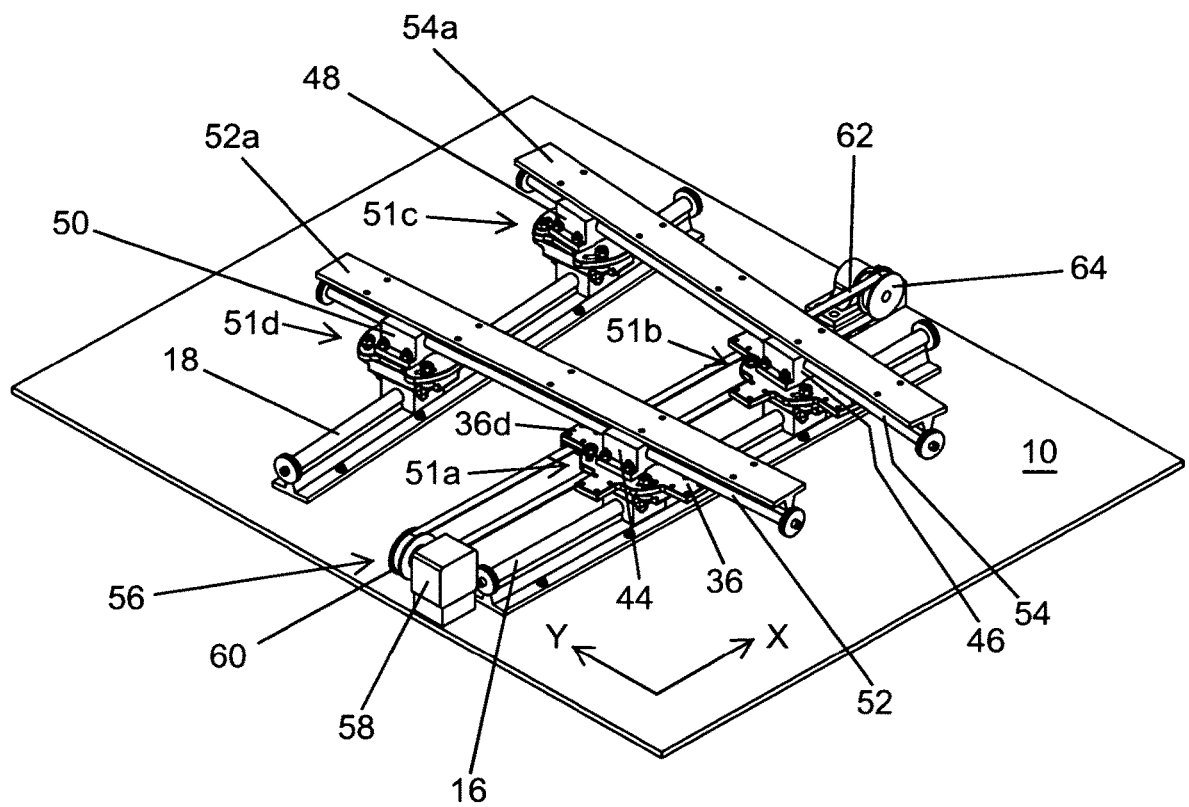

FIG. 1H shows an X-direction drive assembly 56 which moves the X-Y table generally in the X-direction. The drive assembly 56 comprises an X-direction drive motor 58 mounted to the base plate 10 at one end of the lower rail 16, the output shaft of which is connected to a drive pulley 60 around which a drive belt 62 is wrapped. The drive belt 62 is also wrapped around an idler pulley 64 mounted on the base plate 10 at the opposite end of the lower rail 16. The belt 62 is connected to the bearing assemblies 51a and 51b such that rotation of the motor 58 translates the structure in FIG. 1H side to side in the X-direction.

Figure 1I:
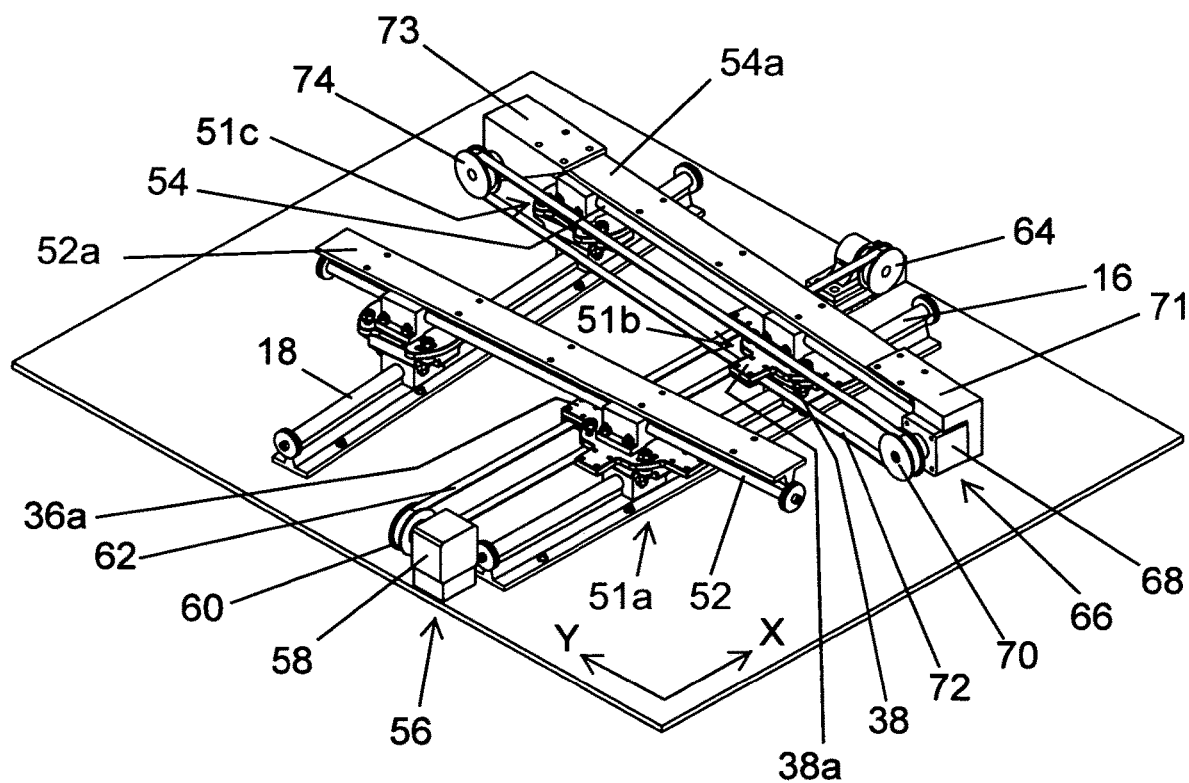

FIG. 1I shows a Y-direction drive assembly 66 that comprises a Y-direction drive motor 68 mounted to one end of the upper rail 54 by means of a hanger 71. The output shaft of the Y-direction motor 68 is connected to a drive pulley 70, around which a drive belt 72 is wrapped. The drive belt 72 is also wrapped around an idler pulley 74 mounted to the other end of the upper rail 54 by means of a hanger 73. The belt 72 is connected to the bearing assembly 51b such that rotation of the motor 68 translates the structure in FIG. 1I fore and aft in the Y-direction. See FIGS. 7A-7D, which illustrate one of the connections of one of the drive belts 72 to one of the tabs 38a on bearing assembly 51b. The connection of the other drive belt 62 to a tab 36a on bearing assembly 51a is similar to that of drive belt 72 to tab 38a on bearing assembly 51b.

Instead of the motors, pulleys, and belts shown in FIGS. 1H and 1I, the X-direction drive assembly 56 and the Y-direction drive assembly 66 may be implemented with standard linear actuators, such as model SLWE-BB-1040 linear actuators available from IGUS. The linear actuators may be driven by NEMA 34 stepper motors. The rest of the description herein is directed to drive systems 56 and 66 containing motors, pulleys, and belts as shown in FIGS. 1H and 1I. Persons skilled in the art would know how to substitute linear actuators for the described motors, pulleys, and belts, so embodiments of the invention involving linear actuators are not depicted here.

Figure 1J:
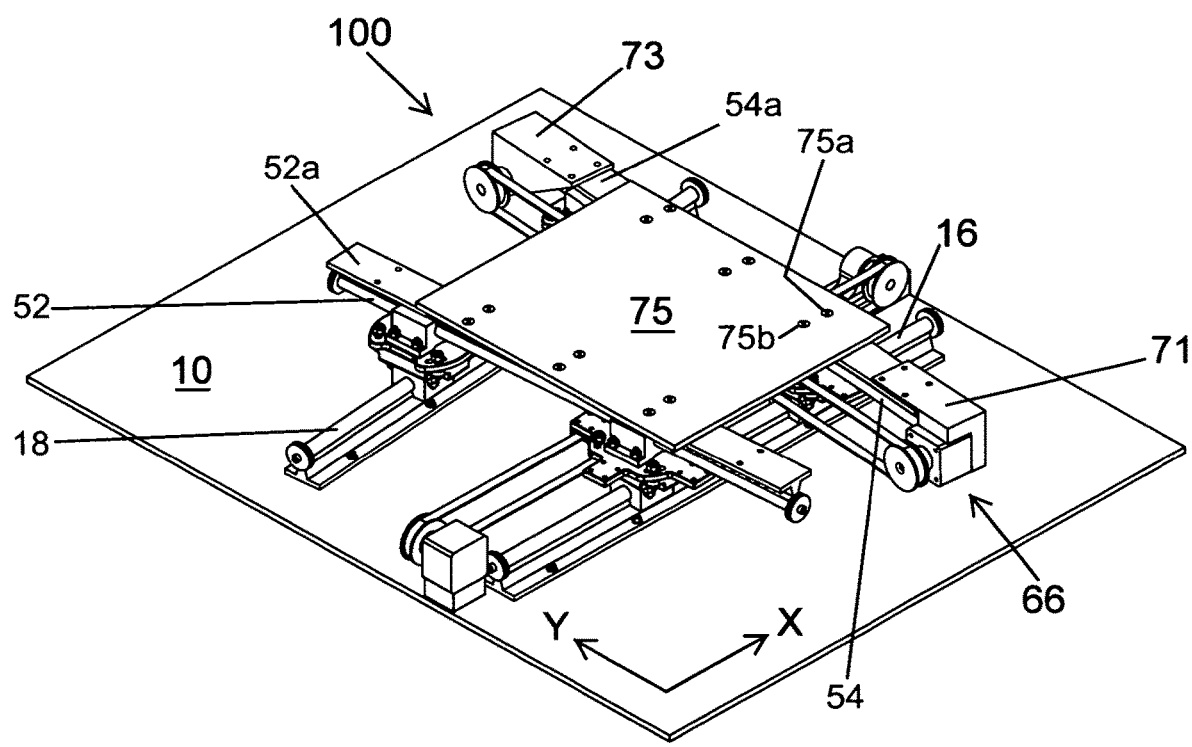

FIG. 1J shows a flat rigid plate 75 bolted or screwed to the flat undersides 52a and 54a of the upper rails 52 and 54, respectively, which completes the structure of an X-Y positioning table 100 used in a manufacturing operation. The plate 75 serves as a work surface that supports a workpiece (not shown) being formed by a manufacturing apparatus. The plate 75 could also support a machine tool that fashions a workpiece in a subtractive manufacturing operation or a spray head in a 3D printer that performs an additive manufacturing operation.

FIG. 2A is a side view of the X-Y positioning table of FIG. 1J taken in a direction generally parallel to the X-axis. FIG. 2B is a front view of the X-Y positioning table of FIG. 1J taken in a direction generally parallel to the Y-axis.

The details of one of the untabbed bearing assemblies 51d is shown in FIGS. 3A-3E. The other untabbed bearing assembly 51c is not depicted because it is identical to the bearing assembly 51a. The bearing assembly 51d in FIGS. 3A-3E comprises a lower linear bearing 26 bolted to a lower bearing mount 34. An upper linear bearing 50 is bolted to an upper bearing mount 42. The lower bearing mount 34, and its associated linear bearing 26 fixedly attached to the lower bearing mount 34, is rotatably attached to the upper bearing mount 42, and its associated linear bearing 50 fixedly attached to the upper bearing mount 42, via a rotary bearing 78 described below.

Figure 5A:
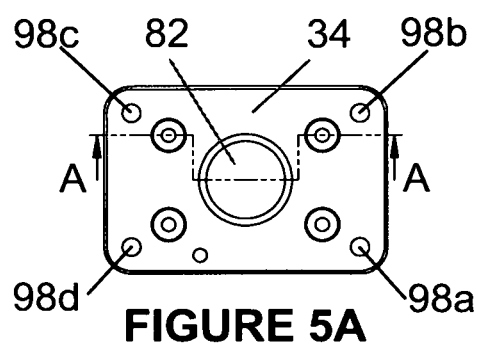
FIG. 5A is a top plan view of the lower bearing mount shown in FIGS. 3A-3E.
Figure 5D:
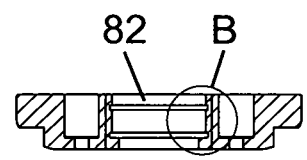
FIG. 5D is cross sectional view of the lower bearing mount of FIG. 5A taken along line A-A in FIG. 5A.
Figure 5B:
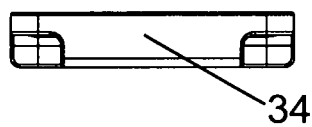
FIG. 5B is a front view of the lower bearing mount shown in FIG. 5A looking in the positive Y-direction.
Figure 5C:
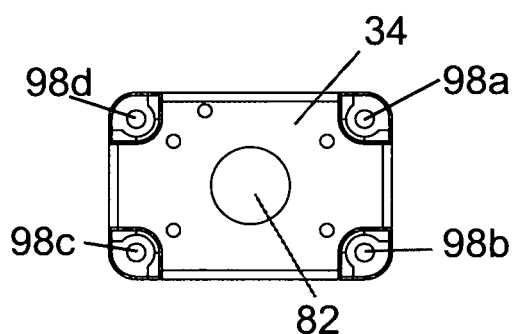
FIG. 5C is a bottom plan view of the lower bearing mount shown in FIGS. 5A-5B.
Figure 5E:
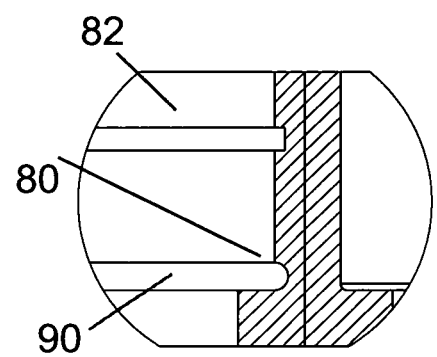
FIG. 5E is a magnified view of the portion of the lower bearing mount of FIG. 5D in the circle labeled B in FIG. 5D.
Figure 6B:
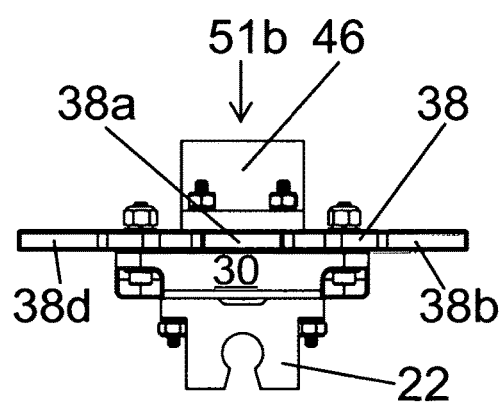
FIG. 6B is a front view of the bearing assembly of FIG. 6A looking in the positive X-direction.
Figure 6C:
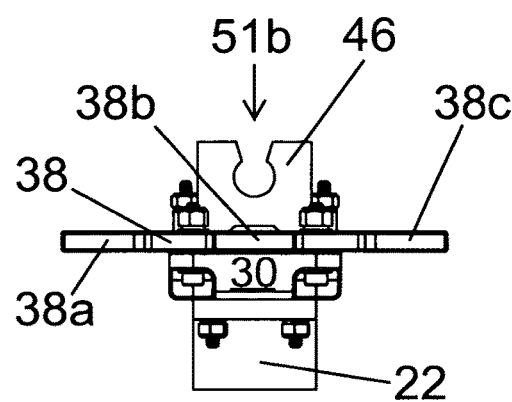
FIG. 6C is a side view of the bearing assembly of FIG. 6A looking in the positive Y-direction.
Figure 6A:
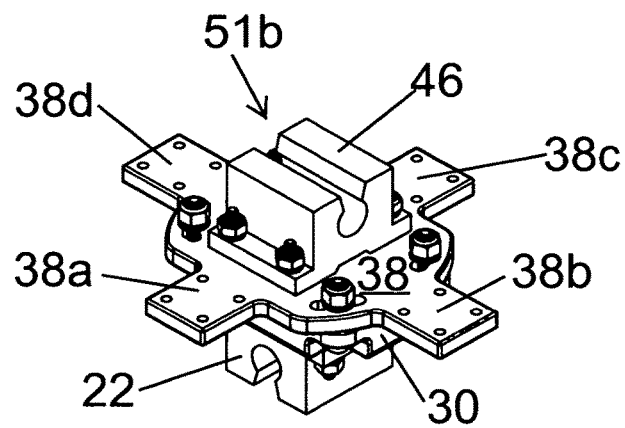
FIG. 6A is an isometric view of one of the two tabbed bearing assemblies shown in FIG. 1F.
Figure 7D:
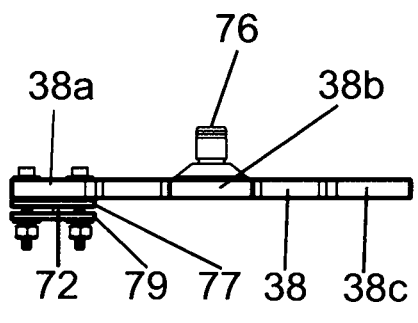
FIG. 7D is a front view of the apparatus of FIG. 7A looking in the positive Y-direction.
Figure 7A:
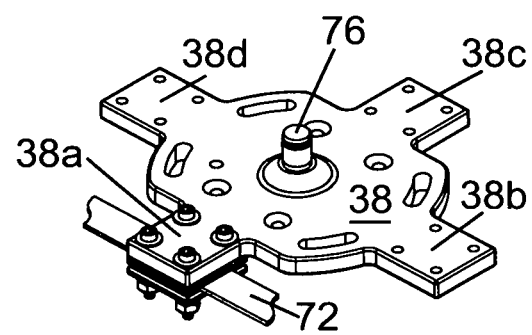
FIG. 7A is a perspective bottom view of one of the upper tabbed bearing mounts, illustrating the attachment of one of the tabs to the top side of a Y-axis drive belt.
Figure 7C:
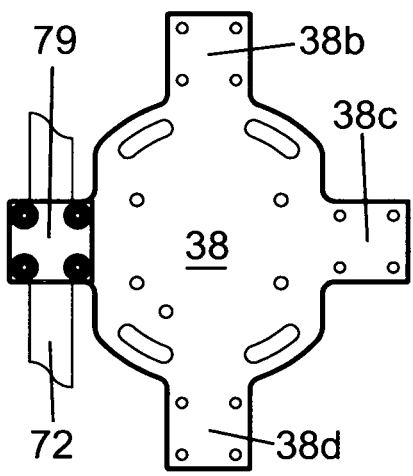
FIG. 7C is a top plan view of the apparatus of FIG. 7A.
Figure 7B:
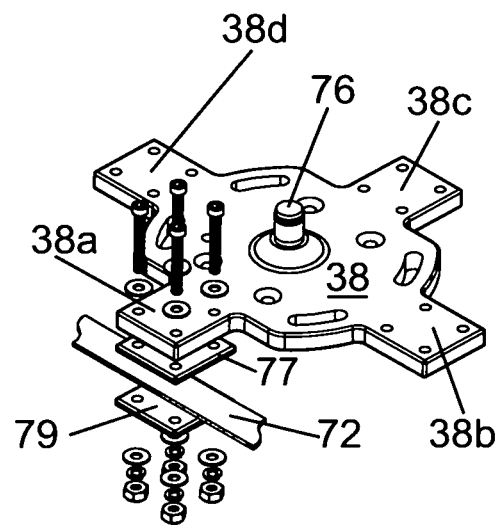
FIG. 7B is an exploded view of the apparatus shown in FIG. 7A.
Figure 8D:
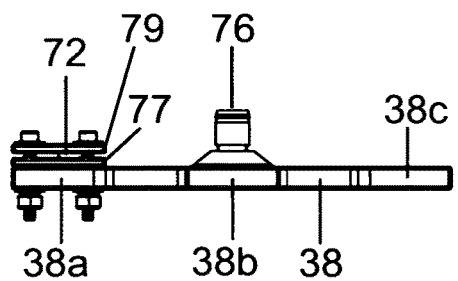
FIG. 8D is a front view of the apparatus of FIG. 8A looking in the positive Y-direction.
Figure 8A:
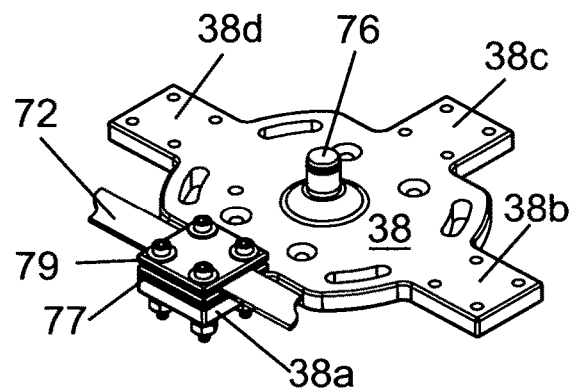
FIG. 8A is a perspective bottom view of one of the upper tabbed bearing mounts, illustrating the attachment of one of the tabs to the under side of a Y-axis drive belt.
Figure 8C:
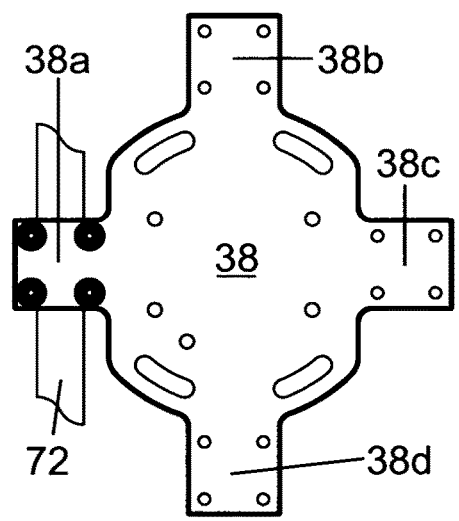
FIG. 8C is a top plan view of the apparatus of FIG. 8A.
Figure 8B:
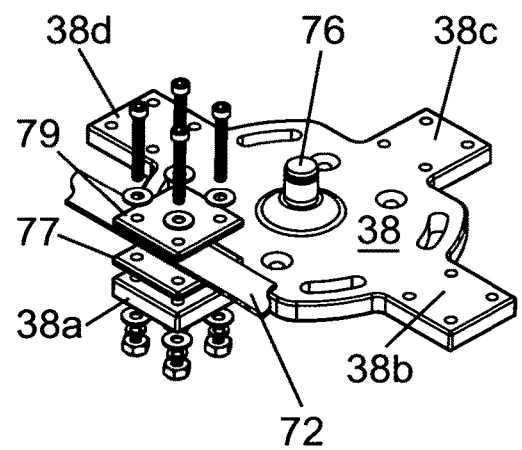
FIG. 8B is an exploded view of the apparatus shown in FIG. 8A.

A spindle 76, shown, for example in FIG. 3E, on the underside of the upper bearing mount 42 is inserted into a rotary ball bearing 78, shown in FIGS. 3D and 3E. The spindle 76 is seated on a shoulder 80 shown in FIG. 5E formed around the circumference of a cylindrical passage 82 through the lower bearing mount 34. As shown in FIG. 3E, lower snap ring 84 located in a groove 86 around the spindle 76 axially secures the spindle 76 to the rotary ball bearing 78 so that the spindle 76 does not pull out of the rotary ball bearing 78. An upper snap ring 88, shown in FIGS. 3D and 3E, in a groove 90, shown in FIG. 5E and formed around the inner circumference of the passage 82, also prevents the spindle 76 and bearing 78 from coming out of the passage 82.

Figure 4B:
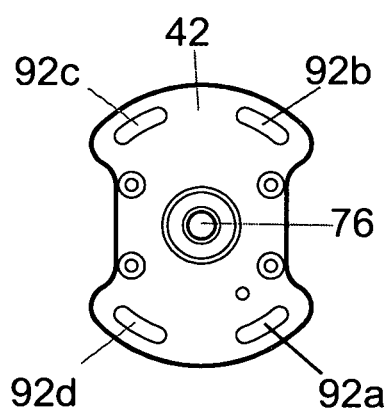
FIG. 4B is a front view of the upper bearing mount shown in FIG. 3A-3E looking in the positive Y-direction.
Figure 4B:
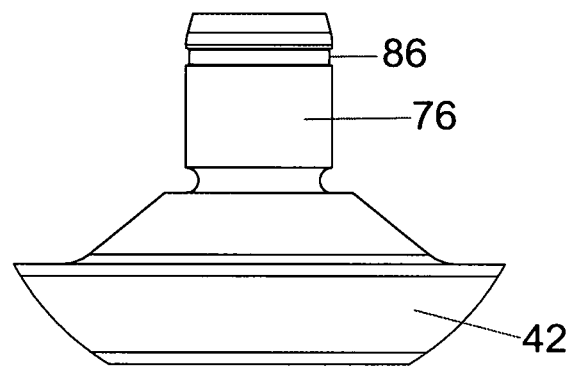
Figure 4B:
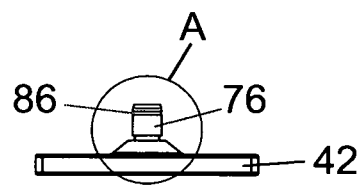

As shown in FIGS. 3D, 3E, and 4A, the upper bearing mount 42 has four curved slotted holes 92a, 92b, 92c, 92d; the lower bearing mount 34 is bolted to the upper bearing mount 42 with nut and bolt assemblies comprising bolts 94a, 94b, 94c, and 94d, nuts 96a, 96b, 96c, and 96d, and associated washers. The nut and bolt assemblies extend through the curved slotted holes 92a, 92b, 92c, and 92d in the upper bearing mount 42 and holes 98a, 98b, 98c, and 98d in the lower bearing mount 34. When the nut and bolt assemblies are loosened, the curved slotted holes 92a, 92b, 92c, and 92d permit the upper bearing mount 42 to be rotated with respect to the lower bearing mount 34 so that the upper linear bearing 50 can be aligned with respect to the lower linear bearing 26 so that the two linear bearings 26 and 50 smoothly slide along their respective non-parallel upper and lower rails. Once that condition is achieved, the nut and bolt assemblies can be tightened to lock the bearings 26 and 50 in place.

FIGS. 6A-6E show the details of one of the tabbed bearing assemblies 51b. The construction of tabbed bearing assembly is essentially the same as that of the other tabbed bearing assembly 51a and the untabbed bearing assemblies 51c and 51d. The only differences between the tabbed bearing assemblies 51a and 51b and the untabbed bearing assemblies 51c and 51d are that tabbed upper bearing mounts 36 and 38 are substituted for the untabbed upper bearing mounts in 40 and 42 in the bearing assemblies.

FIGS. 7A-7D illustrate attachment of the drive belts to the bearing assemblies. FIGS. 7A-7D show a specific example of how the y-axis drive belt 72 is attached to the bearing assembly 51b. The drive belt 72 is clamped to the top side (the non-spindle side) of the tab 38a protruding from the upper bearing mount 38. The belt 72 is sandwiched between clamping members 77 and 79. The sandwich structure is bolted to one side or the other of the tab 38a. Although the drive belt 72 in FIGS. 7A-7D is attached to the side of the bearing mount 38 that does not have the spindle 76, it is not crucial which side of the upper bearing mount 38 the belt 72 is attached to. FIGS. 8A-D show another illustrative attachment of the drive belt 72 to bottom side of the tab 38a. Which side of the tab 38a the drive belt is attached to is wholly dependent upon where the drive belt 72 is with respect to the tab 38a. The goal is to have the drive belt 72 attached to the bearing assembly 51b so that the belt 72 is not stretched up or down by the attachment of the belt 72 to the bearing assembly 51b. Although it is not shown in FIGS. 7A-7D, or in FIGS. 8A-8-D, the x-axis drive belt 62 is fixed to the tab 36b of the upper bearing mount 36 in the same manner that the y-axis drive belt 72 is attached to the tab 38a of the upper bearing mount 38 in FIGS. 7A-7D, or in FIGS. 8A-8-D.

The rotational adjustment of the upper linear bearings with respect to their corresponding lower linear bearings can be achieved without a rotary ball bearing 78. An alternative bearing can comprise a drilled or a machined, slightly tapered, hole and a matching slightly tapered shaft that can be substituted for the spindle 76, ball bearing 78, and passage 82. Once the tapered shaft is inserted in the tapered bearing hole, the unit will never swivel or rotate about its major axis by more than a few degrees (0 to 15 or so degrees), and only once, when the linear bearings are rotationally oriented, and the bolt assemblies, comprising bolts 94a, 94b, 94c, and 94d, nuts 96a, 96b, 96c, and 96d, and associated washers, are tightened, before first use as a positioning system in accordance with the invention. There also is no wear on the rotational shaft or the hole into which the rotational shaft fits when a positioning system in accordance the invention is operating because the hold down bolts described above compress the upper and lower bearing mounts together to stop any rotational motion. The tapered shaft's tight fit into the tapered hole, and the compression of the hold down bolts, absorb any longitudinal and side thrusts, keeping the linear bearings stable with respect to axial rotation and Z-axis motion. A thicker, larger diameter shaft more tightly fitting in the tapered hole would be ideal for large side force operations such those involving massive shock, or prolonged side force machine work operations. No ball bearing would be required at all. All in all, the elimination of the ball bearing 78 and the snap rings 84 and 88 would simplify the unit, make it more robust, and make it less expensive to manufacture, sell, and use. In some embodiments of the invention, the taper of the shaft and hole can be eliminated, and a straight shaft and straight hole can be used instead.

To facilitate assembly of more robust, larger, and tighter fitting shaft units, it would be advisable to refrigerate, or freeze the entire male shaft unit with "dry ice," so that the male shaft unit can be shrunk to fit into the hole and then expanded to full interior concave surface to convex surface contact when the unit expands to "room" temperature, thus creating a good "freeze fit."

A manufacturing apparatus in which this invention is useful may be any apparatus that shapes an object into a desired form. For example, the manufacturing apparatus may perform an additive process that deposits material on a substrate to form an object having a desired shape. One such additive manufacturing apparatus is a 3D printer. Another is a laser scanner. The manufacturing apparatus also may perform a subtractive process that removes material to shape an object having a desired shape. Examples of such subtractive manufacturing apparatus include milling machines, drills, grinders, and the like.

The description thus far contemplates a stationary operative element, such as the spray or deposition head in a 3D printer or the cutting element in a milling machine, and a workpiece that is moved by an X-Y positioning table in accordance with the invention in two dimensions with respect to the operative element. It is also possible to mount the operative element of a manufacturing apparatus on an X-Y positioning table in accordance with the invention and move the operative element in an X-Y plane with respect to a stationary work piece.

Figure 9:
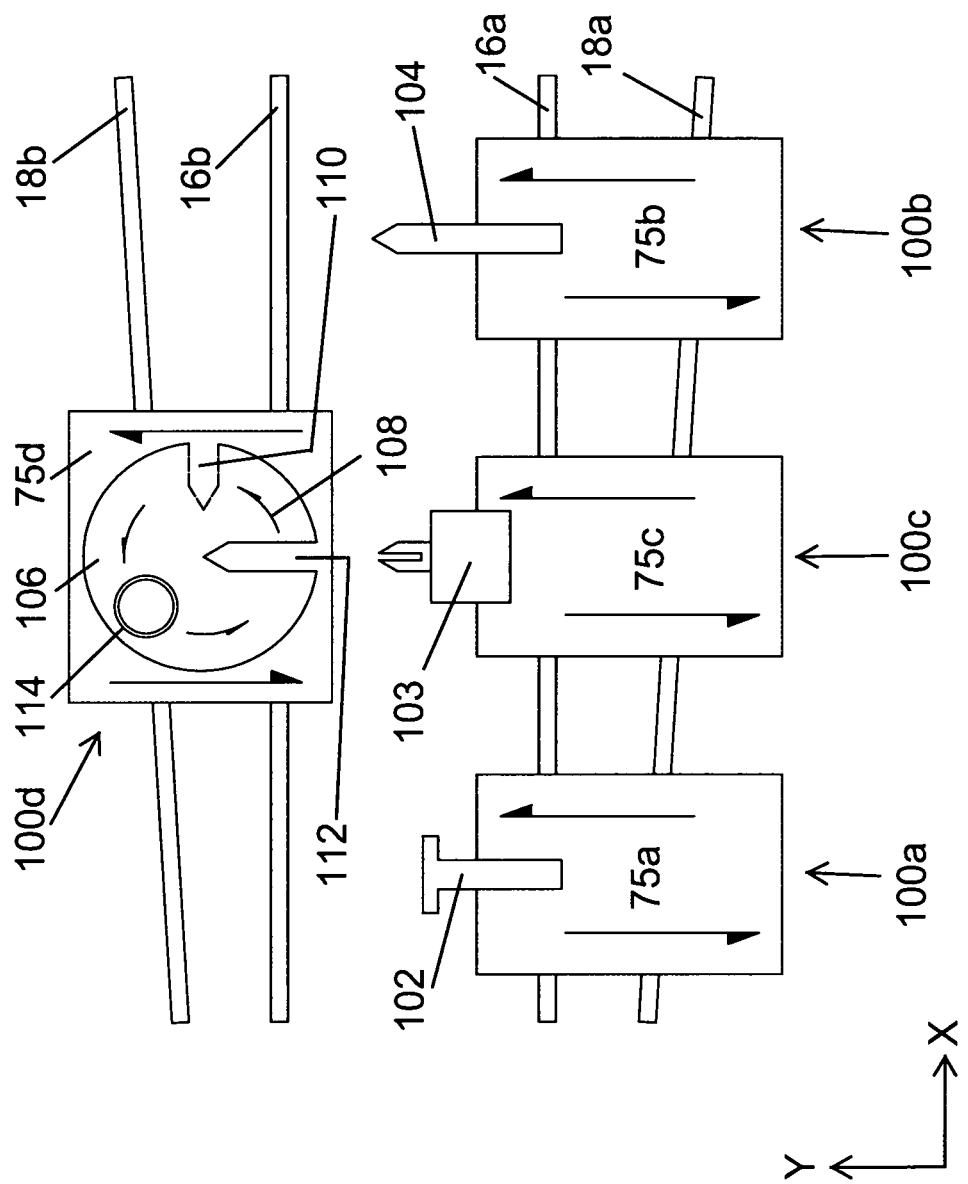
FIG. 9 is a plan view of an illustrative manufacturing system involving multiple X-Y positioning tables.

Examples of the invention thus far described involve one X-Y table 100 shown in FIG. 1J being involved in manufacturing operations. Manufacturing systems involving multiple X-Y tables are also possible. Multiple X-Y tables may run on a single set of lower rails 16 and 18 or on multiple sets of lower rails 16 and 18. FIG. 9 shows an illustrative system involving three X-Y tables 100a, 100b, and 100c supporting different machine tools operating on a workpiece supported on a fourth X-Y table 100d. The three X-Y tables 100a, 100b, and 100c ride on two non-parallel lower rails 16a and 18a. A fourth X-Y table 100d rides on two non-parallel rails 16b and 18b. The table 100d supports a workpiece 106. The X-Y tables 100a, 100b, 100c, and 100d are identical to the X-Y table 100 shown in FIG. 1J. Only the plates 75a, 75b, 75c, and 75d in the X-Y tables 100a, 100b, 100c, and 100d, corresponding to the plate 75 in FIG. 1J, are shown in FIG. 9 for clarity. The rest of the structure of the X-Y tables 100a, 100b, 100c and 100d, not shown in FIG. 9, is identical to that of the X-Y table 100.

The plates 75a and 75b in FIG. 9 support subtractive manufacturing tools. Specifically, the plate 75a illustratively supports a router having a T-slot router bit 102; the plate 75b illustratively supports a drill having a drill bit 104. The X-Y tables 100a and 100b move the router bit 102 and the drill 104, respectively, in a two dimensional X-Y plane to perform machining operations on a workpiece 106 that sits upon a rotary turntable 108 on plate 75d on X-Y table 100d.

In addition, one or both of the router and the drill may have Z-axis drive mechanisms known to those skilled in the art that move the router bit 102 and/or the drill bit 104 along the Z-axis perpendicular to the X- and Y-axes. The plate 75d that is a part of X-Y positioning table 100d rides on two lower rails 16b and 18b. The X-Y positioning table 100d moves the workpiece 106 in an X-Y plane and the turntable 108 rotates the workpiece 106 to a desired angular position. The X-Y table 100d may also have a Z-axis drive that moves the workpiece in the Z-direction perpendicular to the X- and Y-axes. The motions of the X-Y tables 100a, 100b, and 100c, the bits 102 and 104, and the turntable 108 serve to position the workpiece 106 with respect to the cutters so that desired cutting actions can be performed at predetermined positions on the workpiece 106. FIG. 9 shows two illustrative different depth holes 110 and 112 that have been drilled at two angular positions on the workpiece 106 to illustrate two representative cutting actions that may be performed on the workpiece 106.

The manufacturing system of FIG. 9 also includes a third X-Y table 100c that rides on rails 16a and 18a. The table 100c comprises a plate 75c that supports an illustrative additive manufacturing tool, such as a 3D printer 103. The X-Y tables 100c and 100d move the spray head of the 3D printer 103 and the workpiece 106 in a two dimensional X-Y plane to position the workpiece 106 with respect the spray head to perform additive machining operations in a desired location 114 on the workpiece 106. In addition, one or both of the tables 100c and 100d may have a Z-axis drive to control the height of the spray head above the workpiece 106. Again, the turntable 108 controls the angular position of the workpiece 106.

The plate 75 shown in FIG. 1J is moved to a desired position in two dimensions of a Cartesian coordinate plane by the controlling the angular positions of the output shafts of the X- and Y-direction drive motors 58 and 68. The motors 58 and 68 preferably are servomotors that are components of positional servomechanisms that rotate the output shafts of the motors 58 and 68 to desired angular positions and thereby move the plate 75 to points having desired X- and Y-coordinates.

Positional servomechanisms are closed loop control systems that direct a controlled device to a predetermined commanded position. It does this by measuring the actual position of the device and comparing the measured position to a commanded position. A servomotor, like one of the motors 58 and 68, is driven by a signal representing the difference between commanded position and the actual position so as to reduce the value of the difference signal to zero, thus positioning the servomotor at the commanded position. In cheaper systems, motors 58 and 68 may be stepper motors that can be controlled open loop.

A computer or other electronic processing device issues a series of commands representing the commanded path of the plate 75 in a two dimensional plane. Each command comprises two components. The first component represents the X-coordinate of the desired position of the plate 75; the second component represents the Y-coordinate of the desired position of the plate 75. The first component is input to the X-axis servomechanism; the second component is input to the Y-axis servomechanism. The X-axis servomechanism moves the plate 75 along the X-axis to the commanded position along the X-axis. The Y-axis servomechanism moves the plate 75 along the Y-axis to the commanded position along the Y-axis. The plate 75 thus acquires a desired position at the coordinates specified by the aforementioned computer.

The motion of the plate 75 may be either uniaxial or biaxial. In the uniaxial case, the plate 75's motion is restricted to motion along one axis, either the X-axis or the Y-axis. For example, in the case of uniaxial motion along the X-axis, the X axis command from the computer is allowed to vary. The Y-axis command is fixed. The plate 75, therefore, moves to and fro along the X-axis with no Y-axis motion. As discussed here, uniaxial motion in the X-direction is accomplished by keeping the Y-axis component of the position commands constant. Similarly, uniaxial motion in the Y-direction can be achieved by keeping the X-axis component of the position commands constant. Biaxial motion can be achieved by allowing both the X-component and the Y-component of the position commands to vary.

Restriction of motion along an axis can be improved mechanically. Bolting or otherwise attaching a rail to a linear bearing can accomplish this. For example, in the case of the system where the plate 75 is restricted to movement on the X-axis, the bearing 44 can be fastened to the plate 75 and the bearing 46 can be fastened to the plate 75 to prevent the plate 75 from moving in the Y-direction. In this situation, the Y-direction drive assembly 56 also can be removed from the positioning system since it will not be used in this case.

Figure 10:
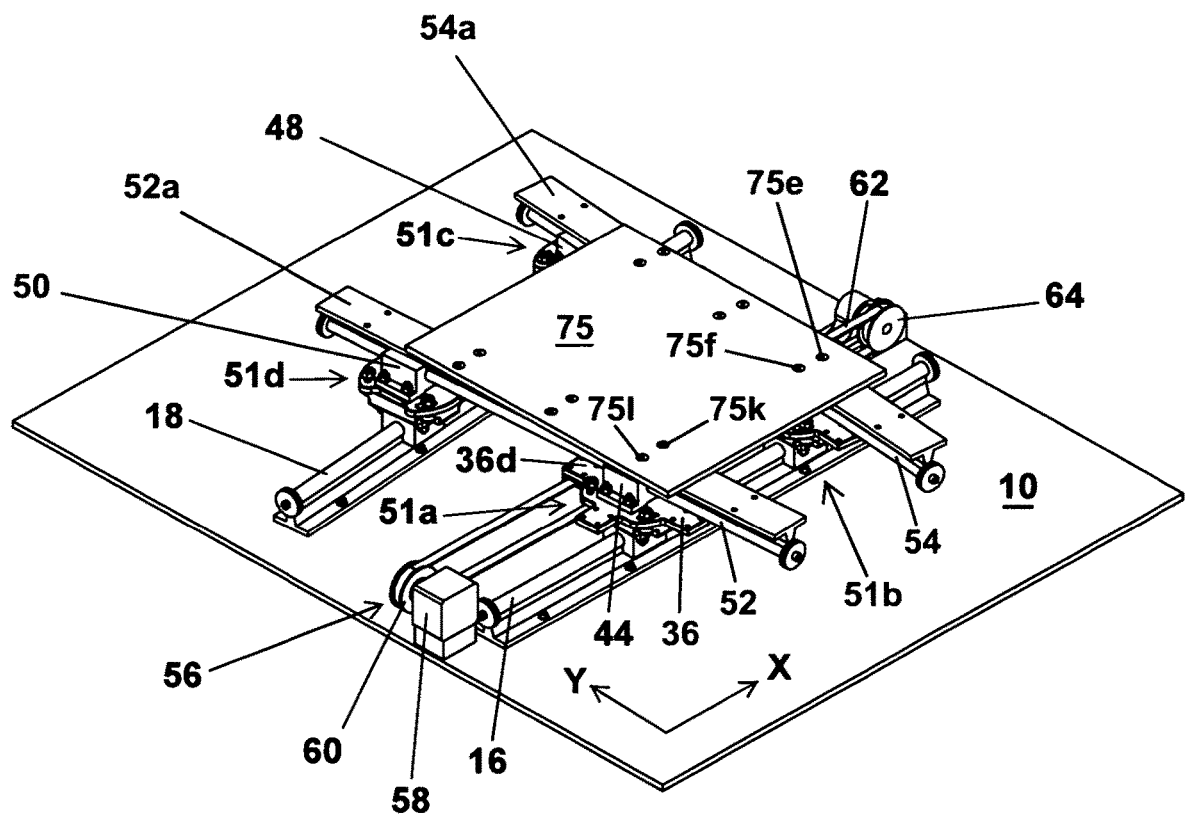
FIG. 10 is a depiction of the apparatus of FIG. 1J without the Y-axis drive mechanism.

Regarding mechanical restriction of motion in one axis, FIG. 10 shows the X-Y table 100 of FIG. 1J minus the Y-axis drive assembly 56. Four of the illustrative twelve fasteners that hold down the plate 75 to upper rails 52 and 54 are indicated in FIG. 10 by reference numerals 75e, 75f, 75j, and 75l. Fasteners 75e and 75f attach the plate 75 to the backside of rail 54; fasteners 75k and 75l attach the plate 75 to the backside of rail 52.

Figure 11:
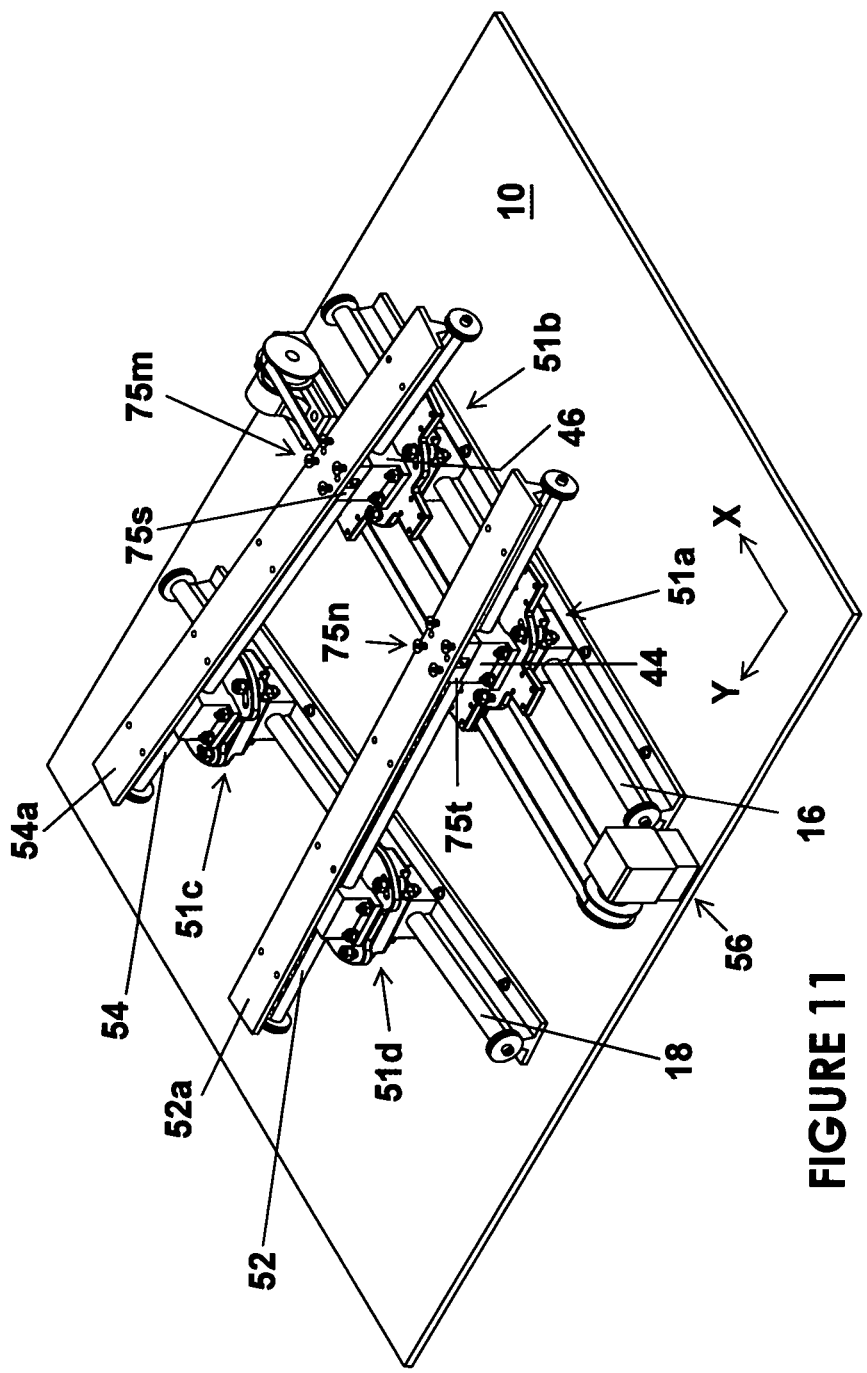
FIG. 11 removes the plate shown in FIG. 10 used in a biaxial movement embodiment.

FIG. 11 removes the plate 75 from the structure of FIG. 10. The structure of FIG. 11 shows an example of mechanical restriction of motion to one axis comprising two six element rectangular clusters of fasteners 75m and 75n that are involved in connecting the plate 75 to other structures in the X-Y table 100 described in more detail below. The fasteners on the corners of the cluster 75m immobilize the rail 54 and the plate 75 with respect to the upper bearing 46, thereby preventing motion of the plate 75 in the Y-direction. Similarly, the fasteners on the corners of cluster 75n immobilize the rail 52 and the plate 75 with respect to the upper bearing 44, thereby providing additional restriction of Y-axis motion of the plate 75.

Figure 12:
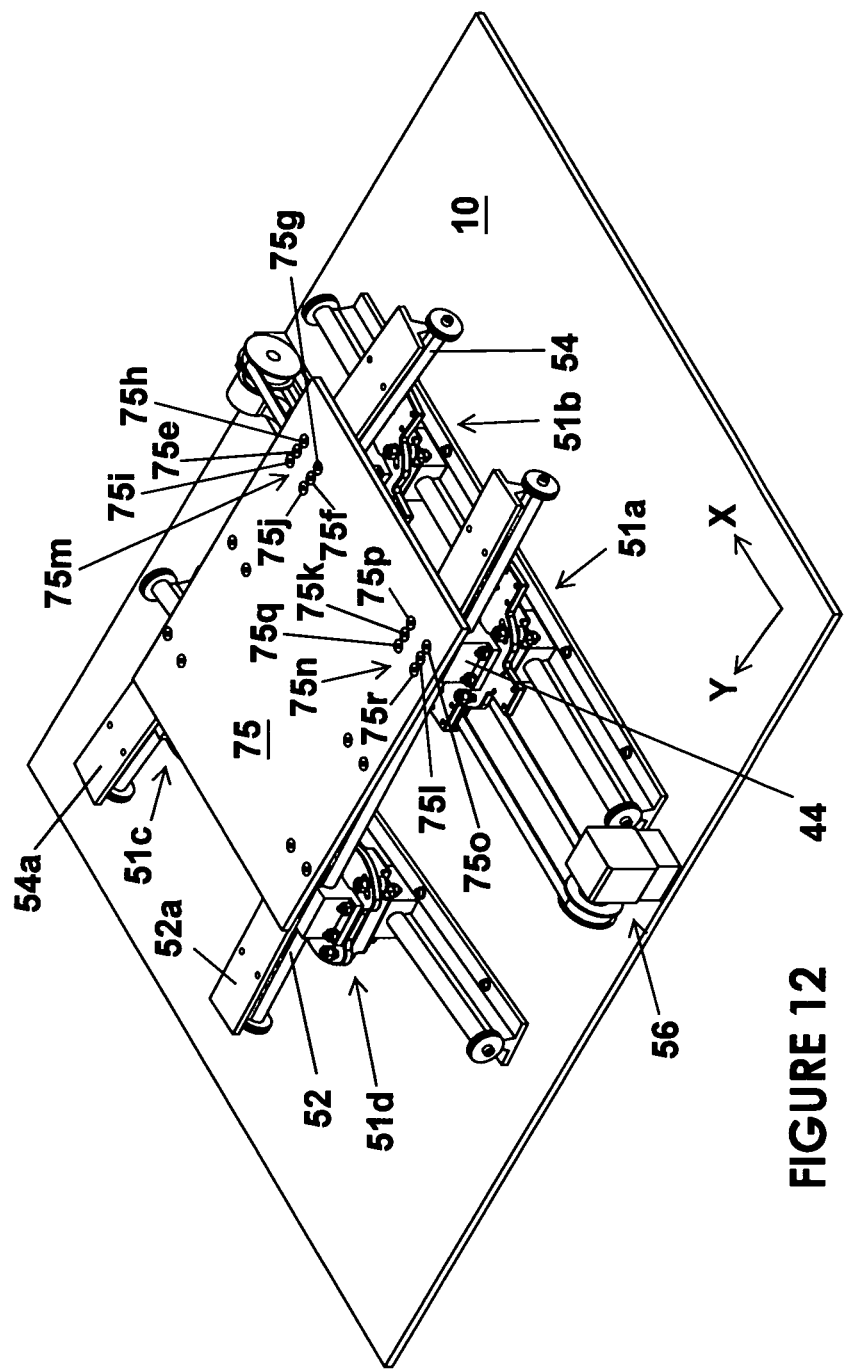
FIG. 12 replaces the plate in FIG. 10 with a plate useful in a uniaxial movement embodiment.
Figures 13, 13A:
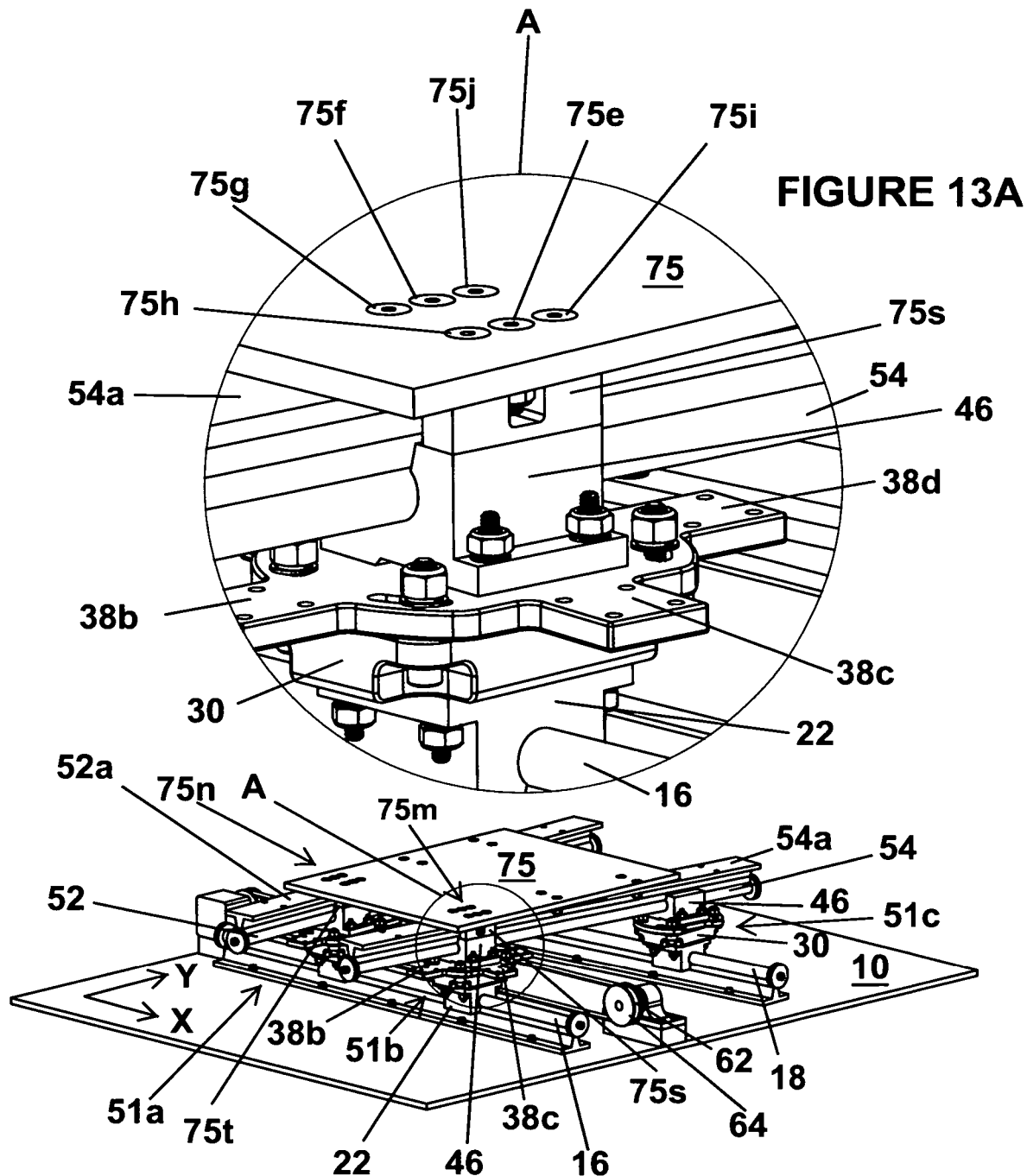
FIG. 13 is a perspective view of a complete uniaxial movement positioning table.
FIG. 13A is a magnified view of the structure inside the circle A in FIG. 13.

FIG. 12 shows plate 75 specifically configured for uniaxial operations reinstalled on the X-Y table with the clusters 75m and 75n in place restricting the plate 75 to uniaxial motion in the X-direction. The fasteners 75e and 75f in cluster 75m secure the plate 75 to the backside 54a of lower rail 54. The fasteners 75g, 75h, 75i, and 75j in cluster 75m secure the plate 75 to the top of the upper bearing 46 through a standoff on each side of the the rail 54. One of the standoffs is indicated by reference numeral 75s in FIGS. 11, 13, and 13A. The fasteners 75g, 75h, 75i, and 75j may each be any suitable fastener such as a screw each extending through plate 75, through a standoff, and into the top of bearing 46. As mentioned above, fasteners 75k and 75l fix the plate 75 to the backside 54a of rail 54.

The fasteners 75k and 75l in cluster 75n secure the plate 75 to the backside 52a of lower rail 52. The fasteners 75o, 75p, 75q, and 75r in cluster 75n secure the plate 75 to the top of the upper bearing 44 through a standoff on each side of the the rail 52. One of the standoffs is indicated by reference numeral 75s in FIGS. 11, 13, and 13A. The other standoff is indicated by a reference numeral 75t in FIG. 11.

The fasteners 75g, 75h, 75i, and 75j in cluster 75m and the fasteners 75o, 75p, 75q, and 75r in cluster 75n may each be any suitable fastener, such as a screw, each screw extending through plate 75, through an associated standoff, and into the tops of bearings 44 and 46 as the case may be.

Figure 14:
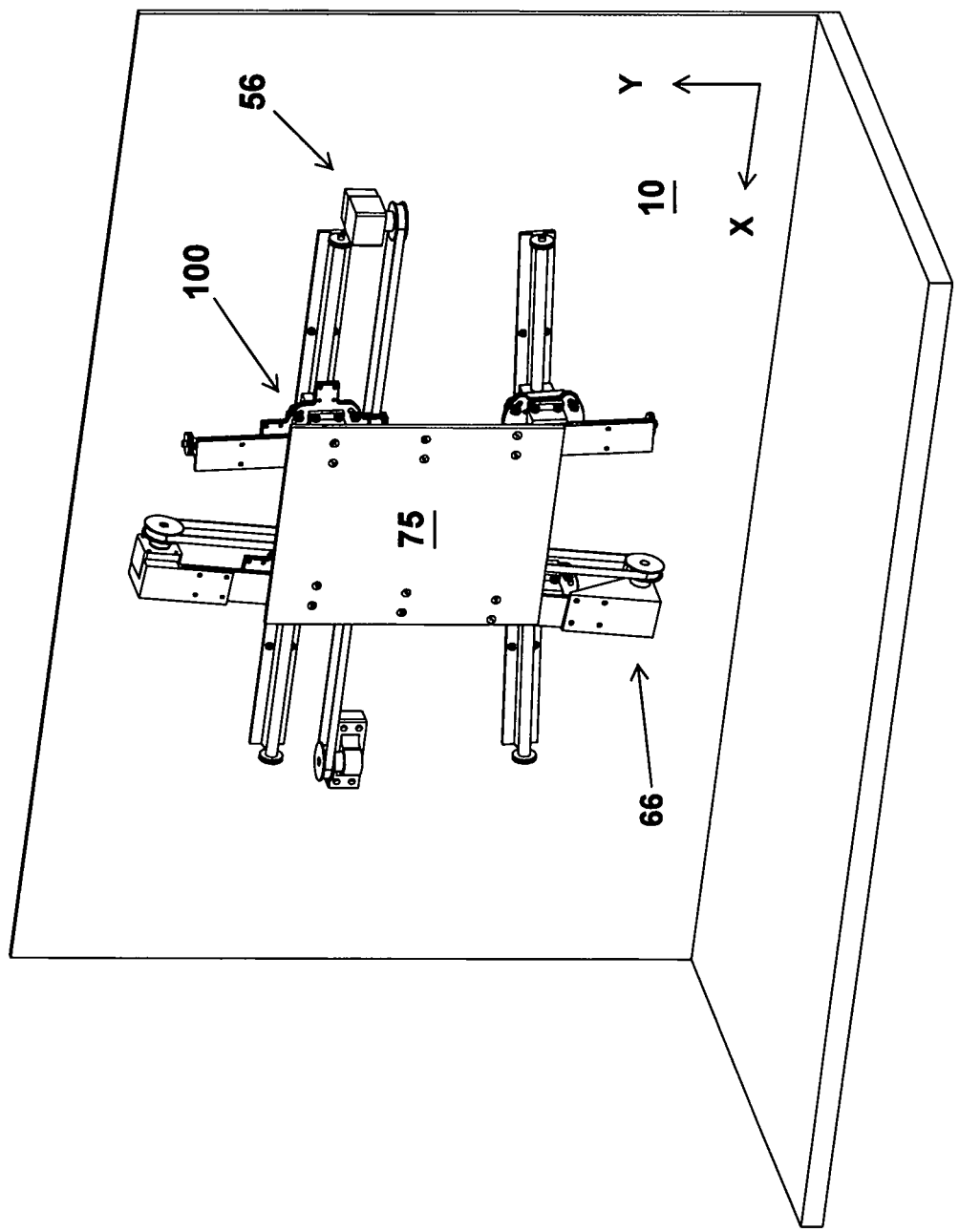
FIG. 14 is perspective view of a biaxial positioning system in accordance with the invention disposed on a non-horizontal base.
Figure 15:
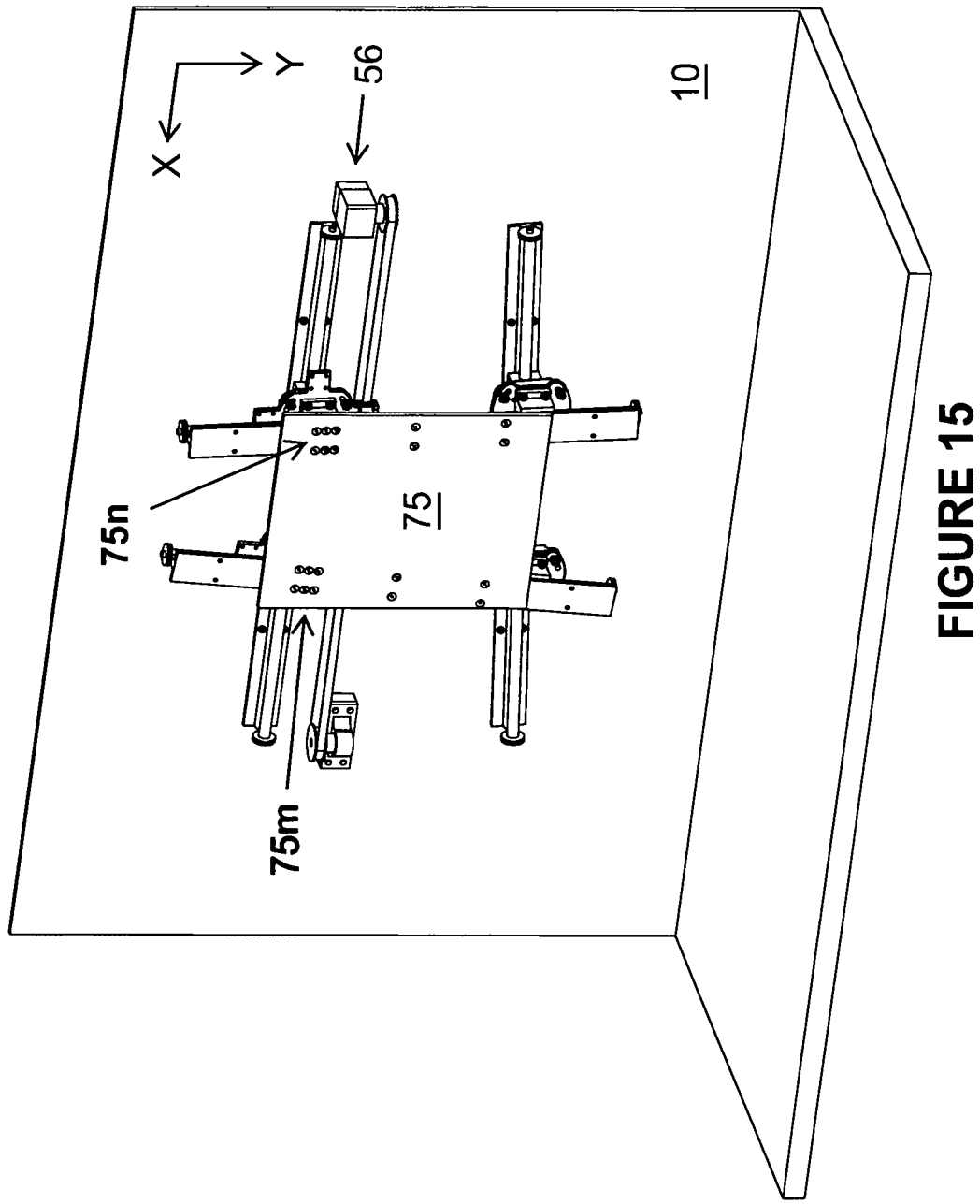
FIG. 15 is a perspective view of a uniaxial version of the positioning system of FIG. 14.

The embodiments of the invention thus far described involve a horizontally disposed base 10 that supports a positioning table 100. A base 10, however, can have any orientation. For example, the base 10 can be a vertically disposed wall that supports a previously described biaxial positioning table 100, as shown in FIG. 14. Uniaxial embodiments are also possible, as shown in FIG. 15. This arrangement can be used to attach a flat panel TV, computer monitor, picture, or the like to the wall. The TV or other such item would be attached to the plate 75 using mounting hardware on the back of the item being mounted. In the biaxial FIG. 14 embodiment, the X-drive system 56 and Y-drive system 66 would be controlled to position the wall mounted item at desired X-Y-coordinates on the wall. In the uniaxial FIG. 15 embodiment, the X-drive system 56 would be controlled to position the wall mounted item at desired X-coordinate on the wall.

CONCLUSION

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited in the claims set forth below.

The invention claimed is:

1. A positioning system adapted to locate a first object with respect to a second object, comprising:
    first and second non-parallel rails attached to the first object;
    third and fourth non-parallel rails attached to the second object; and
    a bearing system connecting the first and second rails to the third and fourth rails so that the first object is smoothly translatable with respect to the second object, in which the bearing system comprises:
    first and second bearing assemblies connecting the third rail to the first and second rails; and
    a third and fourth bearing assemblies connecting the fourth rail to the first and second rails.

2. The positioning system of claim 1, in which the first, second, third, and fourth bearing assemblies each comprise:
    a first linear bearing slideably engaged with one of the first and second rails, and
    a second linear bearing slideably engaged with one of the third and fourth rails and rotatably connected to the first linear bearing.

3. The positioning system of claim 2, in which each of the bearing assemblies further comprise:
    a first mounting plate that supports the first linear bearing;
    a second mounting plate that supports the second linear bearing; and
    a rotational bearing between the first and second mounting plates adapted to facilitate rotation of the first linear bearing with respect to the second linear bearing to achieve a desired rotational orientation of the first and second linear bearings.

4. The positioning system of claim 3, in which each of the bearing assemblies further comprises:
    a locking mechanism that fixes the rotational orientation of the first and second linear bearings.

5. The positioning system of claim 1, in which the first object is a workpiece supported on a worktable and the second object is a manufacturing apparatus.

6. The positioning system of claim 5, in which the manufacturing apparatus is an additive manufacturing apparatus.

7. The positioning system of claim 6, in which the manufacturing apparatus is a 3-D printer.

8. The positioning system of claim 6, in which the manufacturing apparatus is a 3-D laser scanner.

9. The positioning system of claim 1, in which the manufacturing apparatus is a subtractive manufacturing apparatus.

10. The positioning system of claim 9, in which the subtractive manufacturing apparatus is a milling machine.

11. The positioning system of claim 9, in which the subtractive manufacturing apparatus is a drilling machine.

12. The positioning system of claim 9, in which the subtractive manufacturing apparatus is a grinding machine.

13. The positioning system of claim 1, further comprising:
    a motor system adapted to smoothly move the first object in two generally orthogonal directions to a desired position with respect to the second object.

14. The positioning system of claim 13, in which the motor system comprises:
    a first motor adapted to move the first object in a first direction; and
    a second motor adapted to move the first object in a second direction generally perpendicular to the first direction.

15. The positioning system of claim 14, in which the motor system comprises:
    a first drive pulley connected to an output of the first motor;
    a second drive pulley connected to an output of the second motor;
    a first idler pulley spaced from the first drive pulley;
    a second idler pulley spaced from the second drive pulley;
    a first drive belt wrapped around the first drive pulley and the first idler pulley;
    a second drive belt wrapped around the second drive pulley and the second idler pulley;
    a first clamping structure that attaches the first drive belt to the bearing system; and
    a second clamping structure that attaches the second drive belt to the bearing system.

16. The positioning system of claim 15, in which the first clamping structure comprises:
    first clamping members on either side of the first drive belt that squeeze the first drive belt, the clamping members being bolted to either side of a first tab extending from one of the bearing assemblies.

17. The positioning system of claim 16, in which the second clamping structure comprises:
    second clamping members on either side of the second drive belt that squeeze the second drive belt, the clamping members being bolted to either side of a second tab extending from another one of the bearing assemblies.

18. The positioning system of claim 1, in which the first and second rails make an angle of about 5° to 15° with respect to one another, and the third and fourth rails make an angle of about 5° to 15° with respect to one another.

19. A manufacturing system, comprising:
    a plurality of positioning systems of claim 1.

20. The positioning system of claim 1, in which the first object is a room boundary surface and the second object is a flat panel display device.

21. The positioning system of claim 20, in which the first object is a wall and the second object is a flat panel TV.

22. The positioning system of claim 20, in which the first object is a wall and the second object is a computer monitor.

23. The positioning system of claim 20, in which the first object is a wall and the second object is a picture.

24. A manufacturing system, adapted to position two or more first objects in two orthogonal directions with respect to a second object, comprising:
    first and second non-parallel rails attached to one of the first objects;
    third and fourth non-parallel rails attached to the second object;
    a first bearing system connecting the first and second rails to the third and fourth rails so that the first object is smoothly translatable in two orthogonal directions with respect to the second object;
    fifth and sixth non-parallel rails attached to another first object; and
    a second bearing system connecting the first and second rails to the fifth and sixth rails so that the another first object is smoothly translatable in two orthogonal directions with respect to the second object.

\* \* \* \* \*